(12) United States Patent
Mizuno et al.

(10) Patent No.: US 8,889,244 B2
(45) Date of Patent: *Nov. 18, 2014

(54) TRANSPARENT ELECTRODE DEVICE, INFORMATION INPUT DEVICE, AND ELECTRONIC EQUIPMENT

(75) Inventors: Mikihisa Mizuno, Miyagi (JP); Naohiro Takahashi, Miyagi (JP)

(73) Assignee: Dexerials Corporation, Tokyo (JP)

( * ) Notice: Subject to any disclaimer, the term of this patent is extended or adjusted under 35 U.S.C. 154(b) by 178 days.

This patent is subject to a terminal disclaimer.

(21) Appl. No.: 13/528,468

(22) Filed: Jun. 20, 2012

(65) Prior Publication Data

US 2013/0004709 A1     Jan. 3, 2013

(30) Foreign Application Priority Data

Jun. 29, 2011   (JP) ................................. 2011-143978

(51) Int. Cl.
B32B 3/24        (2006.01)
G06F 3/044       (2006.01)

(52) U.S. Cl.
CPC ..................................... *G06F 3/044* (2013.01)

USPC ........ 428/138; 428/131; 428/137; 428/195.1; 428/201; 428/209; 345/173

(58) Field of Classification Search
USPC .............. 428/138, 131, 137, 195.1, 201, 209; 345/173
See application file for complete search history.

(56) References Cited

U.S. PATENT DOCUMENTS

2013/0189502 A1*   7/2013   Takahashi et al. .......... 428/195.1

FOREIGN PATENT DOCUMENTS

JP    2010-002958    6/2008
JP    2008-129708    1/2010

* cited by examiner

*Primary Examiner* — William P Watkins, III
(74) *Attorney, Agent, or Firm* — Oliff PLC

(57) ABSTRACT

A transparent electrode device includes: a substrate; an electrode region formed on the substrate using a transparent electroconductive film; and an insulating region disposed on the substrate and adjacent to the electrode region, in which a plurality of random island patterns including patterns having a width of 100 μm or greater, formed using the transparent electroconductive film, are disposed mutually distanced from one another.

13 Claims, 25 Drawing Sheets

AREA PERCENTAGE OF CIRCLES IS 49.8%

AREA PERCENTAGE OF CIRCLES IS 51.4%

TRANSPARENT ELECTRODE DEVICE, INFORMATION INPUT DEVICE, AND ELECTRONIC EQUIPMENT

CROSS REFERENCES TO RELATED APPLICATIONS

The present application claims priority to Japanese Priority Patent Application JP 2011-143978 filed in the Japan Patent Office on Jun. 29, 2011, the entire content of which is hereby incorporated by reference.

BACKGROUND

The present application relates to a transparent electrode device, an information input device, and electronic equipment, and more particularly relates to a transparent electrode device having an electrode region subjected to patterning, an information input device using the transparent electrode device, and electronic equipment using the transparent electrode device provided to a display panel.

An information input device disposed on a display face side of a display panel (a so-called touch panel) is of a configuration where electrode patterns extending in the X direction and electrode patterns extending in the Y direction on a transparent substrate are each arrayed so as to be insulated from each other. These electrode patterns are configured using a transparent electroconductive film formed of a metal oxide such as indium tin oxide (ITO) or a transparent electroconductive film of integrated metal nanowires.

With an information input device of such a configuration, if the resistance value of an electrode pattern configured using a transparent electroconductive film is to be suppressed, a film thickness of a certain degree is unavoidable. This can cause the electrode pattern to be more readily visible from the outer side of the information input device, thus becoming a factor in deterioration of visual recognition of displayed images on the display panel on which this information input device has been disposed.

Accordingly, there has been proposed a configuration where floating dummy electrodes are disposed between the electrode patterns, thus making the existence of the electrode patterns less conspicuous by suppressing contrast between the electrode patterns one another (e.g., see Japanese Unexamined Patent Application Publication Nos. 2008-129708 and 2010-2958)

SUMMARY

However, even with the information input device of the configuration having dummy electrodes provided as described above, regions are formed between the electrode patterns and dummy electrodes where the transparent electroconductive film has been removed in a continuous manner following the electrode patterns. Accordingly, this has not succeeded in making the electrode patterns invisible to the eye.

It has been found desirable to provide a transparent electrode device and information input device which can minimize visual recognition of electrode regions configured of transparent electroconductive film. It has also been found desirable to provide electronic equipment capable of high-definition display with a configuration in which electrode regions made up of transparent electroconductive film are patterned on the display face side of the display panel.

According to an embodiment, a transparent electrode device according to the present application includes a substrate, an electrode region formed on the substrate using a transparent electroconductive film, and an insulating region disposed on the substrate and adjacent to the electrode region. Particularly, the insulating region is a region in which multiple random island patterns, including multiple island patterns having a width of 100 μm or greater, formed using the transparent electroconductive film, are disposed mutually distanced from one another.

Embodiments of the present application also include an information input device using a transparent electrode device of such a configuration, and electronic equipment in which a transparent electrode device of such a configuration is situated on the display face side of a display panel.

With a transparent electrode device of such a configuration, a transparent electroconductive film is disposed as multiple island patterns in insulating regions adjacent to electrode regions configured using the transparent electroconductive film. Accordingly, difference in the covering percentage of the electrode regions and insulating regions by the transparent electroconductive film is suppressed, thereby reducing contrast. Particularly, a configuration including, as island patterns making up insulating regions, patterns of 100 μm in width or more, which are readily visually recognized, enables the range of width of island patterns disposed in the insulating regions to be shifted in a greater direction. Accordingly, this enables the covering percentage by the transparent electroconductive film in the insulating regions to be made even higher, thereby further reducing contrast between the electrode regions and insulating regions, a point which is described in the Detailed Description of Embodiments.

According to the present application as described above, with a transparent electrode device and information input device having electrode regions configured using a transparent electroconductive film, contrast between electrode regions and insulating regions can be suppressed, and visual recognition of the electrode regions can be minimized. Also, with electronic equipment having pattern formation of electrode regions formed of the transparent electroconductive film on a display face side of a display panel, the electrode regions can be prevented from affecting the display properties of the display panel, and high-definition display can be realized.

Additional features and advantages are described herein, and will be apparent from the following Detailed Description and the figures.

DETAILED DESCRIPTION

Figure 1:
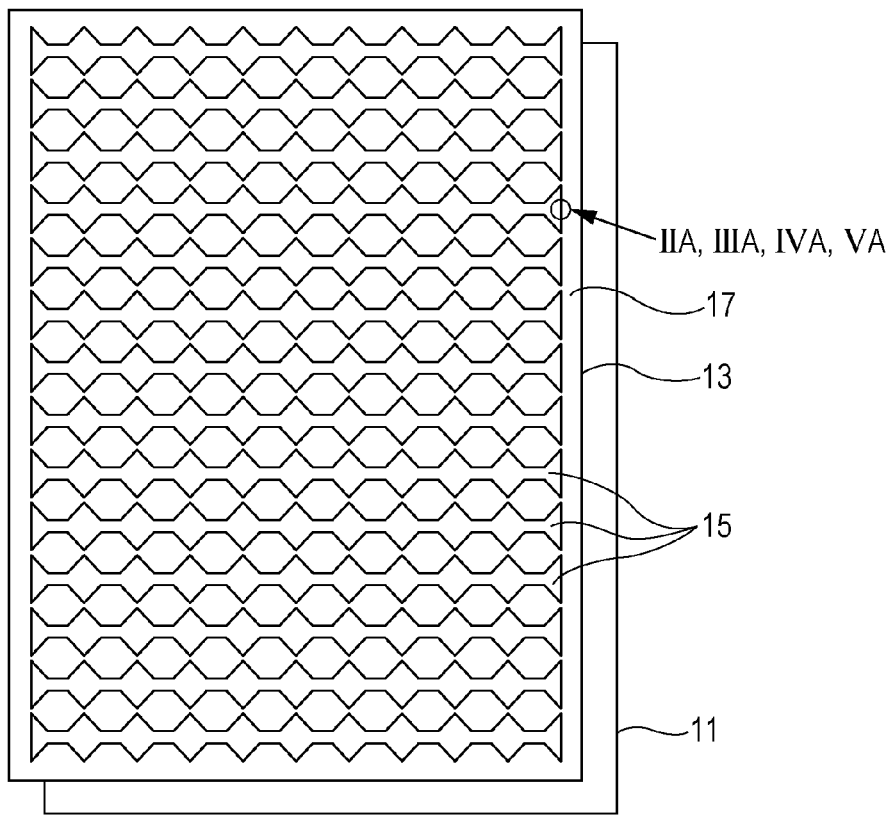
FIG. 1 is a plan view for describing a general configuration of a transparent electrode device according to an embodiment.

Embodiments of the present application will be described in the following order with reference to the drawings.
1. First Embodiment (transparent electrode device with same random pattern provided to electrode region and insulating region)
2. Second Embodiment (transparent electrode device with different random pattern provided to electrode region and insulating region)
3. Third Embodiment (transparent electrode device with groove pattern provided to insulating region as random pattern)
4. Fourth Embodiment (transparent electrode device with random pattern provided to insulating region alone)
5. Method for Fabricating Random Pattern to be Provided to Transparent Electrode Device
6. First Method for Manufacturing Transparent Electrode Device (method using master)
7. Second Method for Manufacturing Transparent Electrode Device (method applying pattern etching)
8. First through Fourth Modifications of Transparent Electrode Device
9. Fifth Embodiment (information input device using transparent electrode device)
10. Sixth Embodiment (display device using information input device)
11. Seventh Embodiment (example of application to electronic equipment)

Note that components which are common among the embodiments will be denoted with the same reference numerals, and redundant description will be omitted.

1. First Embodiment

Figure 2A:
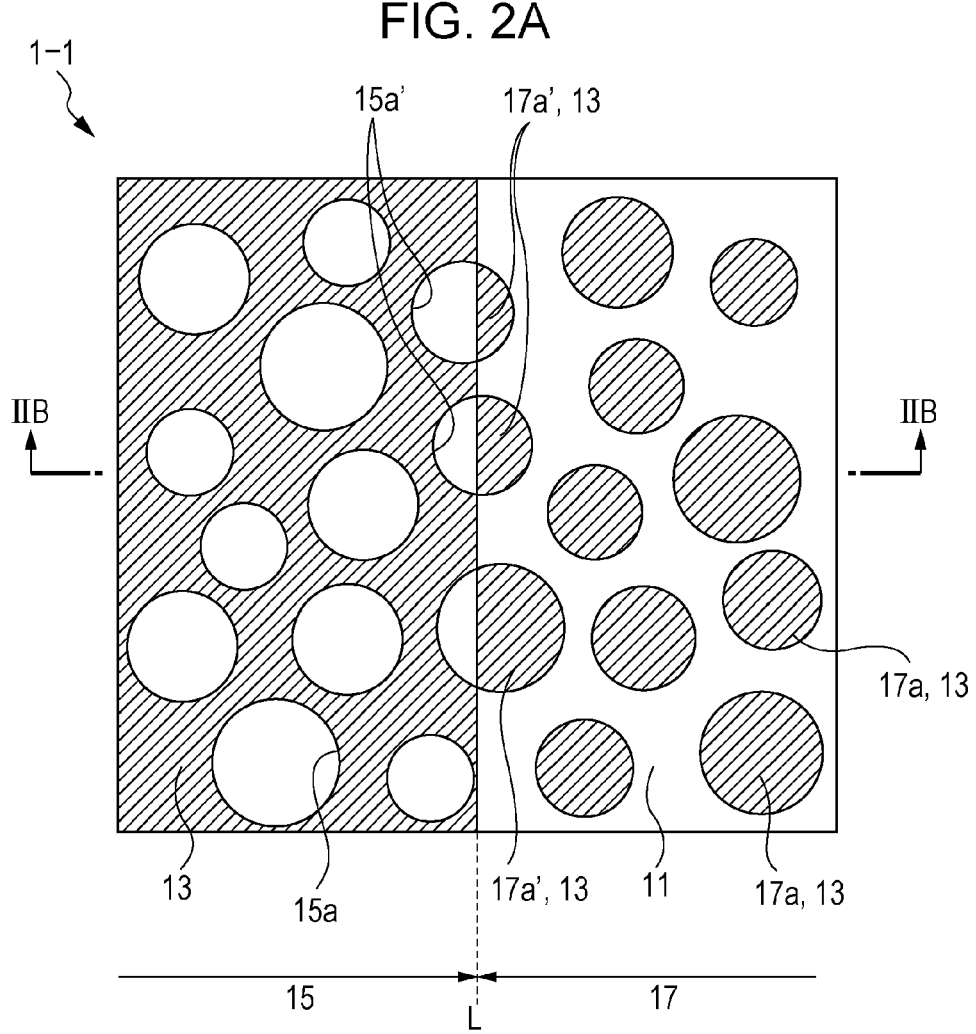
FIG. 2A is an enlarged plan view of a principal portion of a transparent electrode device according to a first embodiment, for description thereof.
Figure 2B:
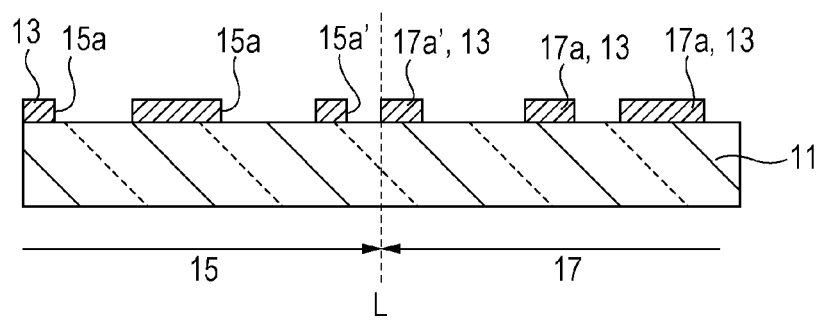
FIG. 2B is a cross-sectional diagram taken along line IIB-IIB in FIG. 2A.

Transparent Electrode Device with Same Random Pattern Provided to Electrode Region and Insulating Region FIG. 1 is a plan view for describing the configuration of a transparent electrode device according to a first embodiment. FIG. 2A is an enlarged plan view of an enlarged portion IIA in FIG. 1, and FIG. 2B is a cross-sectional diagram taken along line IIB-IIB in FIG. 2A. The transparent electrode device 1-1 illustrated in these drawings is a transparent electrode device suitably placed on the display screen side of a display panel for example, and is configured as follows.

That is to say, the transparent electrode device 1-1 includes a substrate 11, and a transparent electroconductive film 13 provided above the substrate 11. The transparent electrode device 1-1 further has multiple electrode regions 15 configured using the transparent electroconductive film 13, and insulating regions 17 disposed adjacent to the electrode regions 15. In particular, the transparent electroconductive film 13 is disposed at the insulating regions 17 as well, and the manner in which the transparent electroconductive film 13 is disposed at the insulating regions 17 is a feature. Details of the materials and regions will be described next.

Substrate 11

The substrate 11 is formed of a transparent material for example, and glass according to the related art or plastic according to the related art can be used, for example. Examples of glass according to the related art include soda lime glass, lead glass, hard glass, quartz glass, liquid crystal glass, and so forth. Examples of plastic according to the related art include triacetyl cellulose (TAC), polyester (TPEE), polyethylene terephthalate (PET), polyethylene naphthalate (PEN), pilyimide (PI), polyamide (PA), aramid, polyethylene (PE), polyacrylate, polyether sulfone, polysulfone, polypropylene (PP) diacetyl cellulose, polyvinyl chloride, acrylic resin (PMMA), polycarbonate (PC), epoxy resin, urea resin, urethane resin, melamine resin, cyclic olefin polymer (COP), norbornene thermoplastic resins, and so forth.

The thickness of the substrate 11 using glass is preferably 20 µm to 10 mm, but is not particularly restricted to this range. The thickness of the substrate 11 using plastic is preferably 20 µm to 500 µm, but is not particularly restricted to this range.

Transparent Electroconductive Film 13

Examples of the material of the transparent electroconductive film 13 include metal oxides such as indium tin oxide (ITO), zinc oxide, indium oxide, antimony-added tin oxide, fluorine-added tin oxide, aluminum-added zinc oxide, gallium-added zinc oxide, silicon-added zinc oxide, zinc oxide-tin oxides, indium oxide-tin oxides, zinc oxide-indium oxide-magnesium oxides, and so forth. Also, in addition to these, metals such as copper, silver, gold, platinum, palladium, nickel, tin, cobalt, rhodium, iridium, iron, ruthenium, osmium, manganese, molybdenum, tungsten, niobium, tantalum, titanium, bismuth, antimony, lead, and so forth, and alloys thereof and so forth, can be given as examples.

Examples of the material of the transparent electroconductive film 13 may, besides the above, include composite materials such as carbon nanotubes dispersed in a binder material, metal nanowires, or the same with colored compound adsorbed thereto so as to prevent diffuse reflection of light at the surface. Further, electroconductive polymers such as substituted or unsubstituted polyaniline, polypyrrole, polythiophene, or (co)polymers made of one type or two types thereof, may be used, two of more types of these may be used compounded.

Electrode Region 15

An electrode region 15 is a region configured using the transparent electroconductive film 13 on the substrate 11, with multiple electrode regions 15 arrayed in parallel, insulated one from another, on the substrate 11. The electrode regions 15 may be of a form where multiple diamond shapes are linked in straight lines such as shown for example, or rectangular shapes, or further shapes selected as appropriate in accordance to the shape of the display face of the display panel where this transparent electrode device 1-1 is to be disposed, or the driving circuit, or the like.

These electrode regions 15 are formed as regions in which multiple hole patterns 15a are formed in the transparent electroconductive film 13. The hole patterns 15a may be provided randomly. That is to say, the electrode regions 15 may have hole patterns 15a of random sizes randomly arrayed within a set outline shape as a random pattern. In this case for example, circular hole patterns 15a having various radial dimensions are arrayed in the transparent electroconductive film 13, separated from each other so as to be independent, whereby the electroconductivity of the electrode regions 15 is ensured. Note that with such electrode regions 15, the transparent electroconductive film 13 is preferably completely removed at the base portion of the hole patterns 15a, but a part may remain in a thin film form.

Also, we will say that with the electrode regions 15, the covering percentage by the transparent electroconductive film 13 is adjusted by the range of radial dimensions (either diameter or radius) set as to the multiple hole patterns 15a, and the closest distance (smallest interval) between the hole patterns 15a one another. This covering percentage is set for each material and film thickness of the transparent electroconductive film 13 to a degree that the electroconductivity demanded of the electrode regions 15 is obtained. Note that adjustment of the covering percentage of the range by radial dimensions of the hole patterns 15a will be described later in the section regarding the fabrication method of random patterns.

Now, the hole patterns 15a provided to the electrode regions 15 can be readily visually recognized if the size of each is 100 µm or greater. However, the range of radial dimensions of the hole patterns 15a can be set in accordance with the covering percentage by the transparent electroconductive film 13 set for the electrode regions 15, as long as within a range smaller than the minimum region width of the electrode regions 15. Accordingly, the electrode regions 15 may include hole patterns 15a which are 100 µm in diameter or greater.

Insulating Region 17

The insulating regions 17 are regions disposed adjacent to the electrode regions 15, provided to fill in between the electrode regions 15 and to insulate between the electrode regions 15. The insulating regions 17 are formed as regions with multiple island patterns 17a randomly provided, formed using the transparent electroconductive film 13. That is to say, the insulating regions 17 are formed using the transparent electroconductive film 13, with island patterns 17a of random sizes randomly arrayed as a random pattern. In this case for example, circular island patterns 17a formed of the transparent electroconductive film 13 and having various radial dimensions are disposed separated from one another so as to be independently, whereby the insulation of the insulating regions 17 is ensured. Note while the transparent electroconductive film 13 is preferably completely removed between the island patterns 17a, a part of the transparent electroconductive film 13 may remain in a thin film form between the island patterns 17a so long as the insulating regions 17 function as insulating portions.

We will say that with the insulating regions 17, the covering percentage by the transparent electroconductive film 13 is adjusted by the range of radial dimensions (either diameter or radius) set as to the island patterns 17a, and the closest distance (smallest interval) between the island patterns 17a one another. This covering percentage is set so as to be around the same as the covering percentage of the electrode regions 15 by the transparent electroconductive film 13.

Now, to say that the covering percentage is around the same means that the outer shape of the electrode regions 15 and insulating regions 17 is a level which is not visually recognized as being a pattern, for example, with a difference in covering percentage (variation) of 30% or less. Note however, in a case where multiple transparent electrode devices 1-1 are layered and used, the covering percentage of the transparent electroconductive film 13 is added for each layered portion, so that the added difference (variation) value within the face of the substrate 11 is within 30%. As one example, in a case where two transparent electrode devices 1-1 are used, the difference (variation) in covering percentage between the electrode regions 15 and insulating regions 17 in one transparent electrode device 1-1 is 30×(½)%=15% or less.

Also, the island patterns 17a provided to the insulating regions 17 can be readily visually recognized if the size of each is 100 µm or greater. However, the range of radial dimensions of the island patterns 17a can be set to be around the same as with the covering percentage by the transparent electroconductive film 13 set for the electrode regions 15, as long as within a range smaller than the minimum region width of the insulating regions 17. Accordingly, the insulating regions 17 may include island patterns 17a which are 100 μm in diameter or greater so as to raise the covering percentage by the transparent electroconductive film 13, which is a feature.

The range of radial dimensions of the island patterns 17a in the insulating regions 17 including those 100 μm or greater is adjusted in accordance with the covering percentage of the transparent electroconductive film 13 set as to the insulating regions 17. In the event that increasing the covering percentage is desired, this can be realized by increasing the range of the radial dimensions of the island patterns 17a. Also, the covering percentage can be effectively raised by increasing the range of the radial dimensions in the direction of being greater, a point which will be described later.

The island patterns 17a of the insulating regions 17 as described above may be the same as the radial dimensions of the hole patterns 15a in the electrode regions 15, based on the random pattern generated at the same time.

Also, with the insulating regions 17 such as described above, there is, for example, an island pattern 17a' provided at a boundary L with the electrode regions 15, of which the circular pattern has been divided by the boundary L. On the other hand, with the electrode regions 15, there is a hole pattern 15a' provided at the boundary L with the insulating regions 17, of which the circular pattern has been divided by the boundary L. Accordingly, there is a state where, at the boundary L of the electrode region 15 and insulating region 17, multiple circular patterns made up of the island patterns 17a' and hole patterns 15a' are randomly situated.

Note that with a configuration such as described above, the shape of the hole patterns 15a situated in the electrode regions 15 and the island patterns 17a situated in the insulating regions 17 is not restricted to being circular. Examples of the shapes of the hole patterns 15a and island patterns 17a include one type, or a combination of two or more types, selected from a group made up of circles, ellipses, partially-cutaway circles, partially-cutaway ellipses, polygons, polygons of which corners have been trimmed, and indeterminate shapes. In such a case, the electrode regions 15 are provided with hole patterns 15a having a width of 100 μm or greater at the greatest portion, and the insulating regions 17 are provided with island patterns 17a having a width of 100 μm or greater at the greatest portion.

Also, the configuration at the boundary L between a electrode region 15 and insulating region 17 is not restricted to a configuration where one continuous pattern (circular patterns) is divided at the boundary L such as described above. For example, circular hole patterns 15a and island patterns 17a may be provided straddling the boundary L. In this case, hole patterns opened to the insulating region 17 side are provided at the electrode regions 15 near the boundary L, while island patterns opened to the electrode region 15 side are provided at the insulating region 17 near the boundary L.

Advantages of First Embodiment

With the transparent electrode device 1-1 of the configuration described above, multiple hole patterns 15a are provided to the transparent electroconductive film 13 making up the electrode regions 15, thereby suppressing the covering percentage at the electrode regions 15 by the transparent electroconductive film 13. On the other hand, island patterns 17a configured of the transparent electroconductive film 13 are provided at the insulating regions 17 adjacent to the electrode regions 15. Thus, the covering percentage by the transparent electroconductive film 13 is suppressed at the electrode regions 15 and insulating regions 17, whereby the contrast between these regions 15 and 17 can be reduced and the visual non-recognition properties of the patterns (outline shape) of the electrode regions 15 can be improved.

Hole patterns 15a are randomly provided to the transparent electroconductive film 13 at the electrode regions 15, and the transparent electroconductive film 13 is disposed to the insulating regions 17 as random island patterns 17a. Accordingly, the transparent electroconductive film 13 is randomly disposed at the boundary L between the insulating regions 17 and electrode regions 15, so the outline of the electrode regions 15 can be made to be less conspicuous.

In particular, island patterns 17a having a diameter of 100 μm or greater are provided to the insulating regions 17. Generally, hole patterns and island patterns are more readily visually recognized if the size exceeds 100 μm. However, with the first embodiment, patterns having a diameter of 100 μm or greater are included as island patterns 17a making up the insulating regions 17. Thus, the range of the width (diameter) set regarding the random island patterns 17a can be shifted in the direction of increasing, and the covering percentage of the transparent electroconductive film 13 at the insulating regions 17 can be improved. This also is advantageous in that occurrence of moiré, in a case of the island patterns 17a being formed of a cyclic structure in the order of microns or smaller, can be suppressed.

Now, the following Table 1 illustrates the pattern diameter, closest distance between patterns, and pattern filling percentage in a case of having created circular patterns, by distancing densely-generated circular random patterns by reducing the size thereof.

TABLE 1

| No. | Pattern Diameter (range width) μm | Closest Distance μm | Pattern Filling Percentage % |
|---|---|---|---|
| 1 | 50-100 (50) | 15 | 57.0 |
| 2 | | 20 | 57.1 |
| 3 | | 30 | 41.7 |
| 4 | | 50 | 29.4 |
| 5 | | 70 | 21.9 |
| 6 | 70-110 (40) | | 25.8 |
| 7 | 70-230 (160) | | 38.2 |
| 8 | 90-250 (160) | | 41.1 |
| 9 | 190-330 (140) | | 50.7 |
| 10 | 230-430 (200) | | 55.8 |
| 11 | 230-530 (300) | | 58.9 |
| 12 | | 50 | 64.6 |
| 13 | | 30 | 71.5 |

Comparing No. 5 through No. 11 in Table 1, we can see that if the closest distance between patterns is the same, the greater the pattern diameter is the greater the pattern filling percentage is. Further, comparing No. 5 and No. 6, we see that the diameter of the No. 8 pattern is 70 to 110 μm which is greater, and the pattern filling percentage is great though the pattern diameter range width is 40 μm which is small. This is true for the comparison between No. 8 and No. 9 as well.

Translating this into the insulating regions 17, by shifting the diameter range in the direction of being greater rather than increasing the diameter range width of the island patterns 17a enables the covering percentage of the transparent electroconductive film 13 to be increased while maintaining the closest distance between island patterns 17a at a realistic value for the fabricating process.

Consequently, according to the first embodiment, the covering percentage of the transparent electroconductive film 13 at the insulating regions 17 can be increased and contrast with the electrode regions 15 effectively reduced, whereby the visual non-recognition of the electrode regions 15 in the transparent electrode device 1-1 can be improved. Note that while island patterns 17a having a diameter of 100 μm or greater are more readily visually recognized, but the island patterns 17a are randomly arrayed in the insulating regions 17, so this is less unsightly than the outer shapes of the electrode regions 15 being visually recognized.

2. Second Embodiment

Figure 3A:
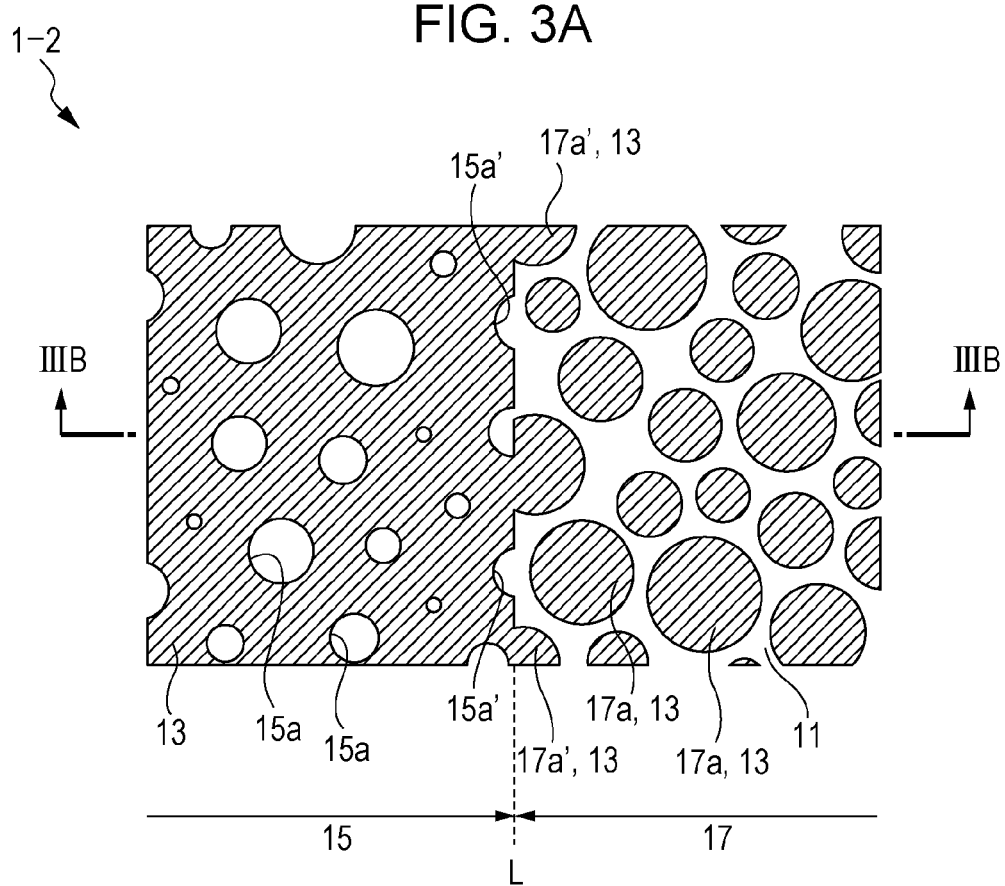
FIG. 3A is an enlarged plan view of a principal portion of a transparent electrode device according to a second embodiment, for description thereof.
Figure 3B:
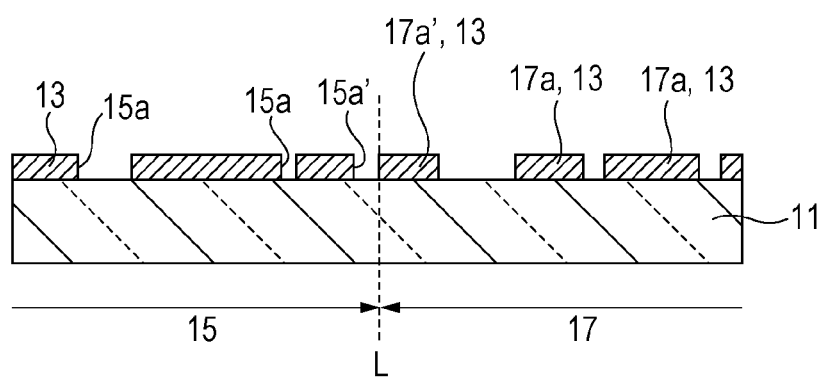
FIG. 3B is a cross-sectional diagram taken along line IIIB-IIIB in FIG. 3A.

Transparent Electrode Device with Different Random Pattern Provided to Electrode Region and Insulating Region FIG. 3A is an enlarged plan view for describing the configuration of a transparent electrode device according to a second embodiment, corresponding to the enlarged portion IIIA in FIG. 1, and FIG. 3B is a cross-sectional diagram taken along line IIIB-IIIB in FIG. 3A. A transparent electrode device 1-2 illustrated in these drawings differs from the transparent electrode device according to the first embodiment described with reference to FIGS. 2A and 2B in that the hole patterns 15a of the electrode regions 15 and the island patterns 17a of the insulating regions 17 are configured of different random patterns. Other configurations are the same as with the first embodiment.

That is to say, the hole patterns 15a provided to the electrode regions 15 and the island patterns 17a provided to the insulating regions 17 are based on random patterns generated separately, for example, and are based on random patterns separately generated under different generating conditions. In this case, at the boundary L between the electrode region 15 and the insulating region 17 in FIG. 3A, the hole patterns 15a' and island patterns 17a' having the circular patterns thereof divided by the boundary L are randomly situated following the boundary L.

Also, the hole patterns 15a provided to the electrode regions 15 and the island patterns 17a provided to the insulating regions 17 may be circular random patterns generated at one time with the same algorithm reduced at different reduction scales, or may be patterns changed to different shapes and reduced. In this case, there is a state where, at the boundary L of the electrode region 15 and insulating region 17, multiple patterns made up of the island patterns 17a' and hole patterns 15a' having different sizes or shapes are randomly situated. Fabrication of such different random patterns will be described later in the section regarding the fabrication method of random patterns.

Also, note that the covering percentage of the electrode regions 15 by the transparent electroconductive film 13 may be partially adjusted to different values. For example, in the event that the width in the direction perpendicular to the electroconductive direction in the electrode regions 15 is not constant, the placement state of the hole patterns 15a may be adjusted such that the covering percentage of the transparent electroconductive film 13 increases a portions where the width is narrow, so as to suppress local increase in sheet resistance.

Suppressing the difference in covering percentage by the transparent electroconductive film 13 to a level where the outer shapes of the electrode regions 15 and insulating regions 17 such as described above are not visually recognized as patterns, is the same as with the first embodiment. That is to say, the difference in the covering percentage of the electrode regions 15 and insulating regions 17 by the transparent electroconductive film 13 is within 30%, and in the event that multiple transparent electrode devices 1-2 have been layered and used, this is to be within a value of the 30% divided by the number of transparent electrode devices 1-2.

Also, the electrode regions 15 may include hole patterns 15a with a diameter of 100 μm or greater, the same as with the first embodiment. On the other hand, the insulating regions 17 are provided with island patterns 17a having a diameter of 100 μm or greater, to raise the covering percentage by the transparent electroconductive film 13.

Note that in the same way as with the first embodiment, the shapes of the hole patterns 15a of the electrode regions 15 and the island patterns 17a of the insulating regions 17 are not restricted to circular shapes, and it is sufficient for island patterns 17a having a width of 100 μm or greater to be provided to the insulating regions 17 at the greatest portions. Also, the shapes of the hole patterns 15a disposed in the electrode regions 15 and the island patterns 17a disposed in the insulating regions 17 may be shapes different from each other.

Advantages of Second Embodiment

In the same way as with the first embodiment, the transparent electrode device 1-2 described above has multiple hole patterns 15a randomly disposed in the transparent electroconductive film 13 making up the electrode regions 15, and multiple island patterns 17a configured of the transparent electroconductive film 13 randomly disposed at the insulating regions 17. Also, the insulating regions 17 includes island patterns 17a having a diameter of 100 μm or greater. Accordingly, advantages the same as with the first embodiment can be obtained.

Additionally, with the transparent electrode device 1-2 according to the second embodiment, the hole patterns 15a of the electrode regions 15 and the island patterns 17a of the insulating regions 17 are configured of different random patterns. Thus, even in the event that the covering percentage of the transparent electroconductive film 13 at the electrode regions 15 is set at a value exceeding 50%, the covering percentage of the island patterns 17a (i.e., transparent electroconductive film 13) at the insulating regions 17 can be made to be around the same as with the electrode regions 15. As a result, both reduction in resistance value of the electrode regions 15 and improvement in visual non-recognition can be realized.

Also, in particular, the hole patterns 15a of the electrode regions 15 and the island patterns 17a of the insulating regions 17 can be based on different random patterns generated under different generating conditions. In this case, at the boundary L between the electrode region 15 and the insulating region 17, the hole patterns 15a' and island patterns 17a' having the circular patterns thereof divided by the boundary L are randomly situated following the boundary L. Accordingly, the outlines of the electrode regions 15 can be made less conspicuous as compared with the first embodiment.

3. Third Embodiment

Figure 4A:
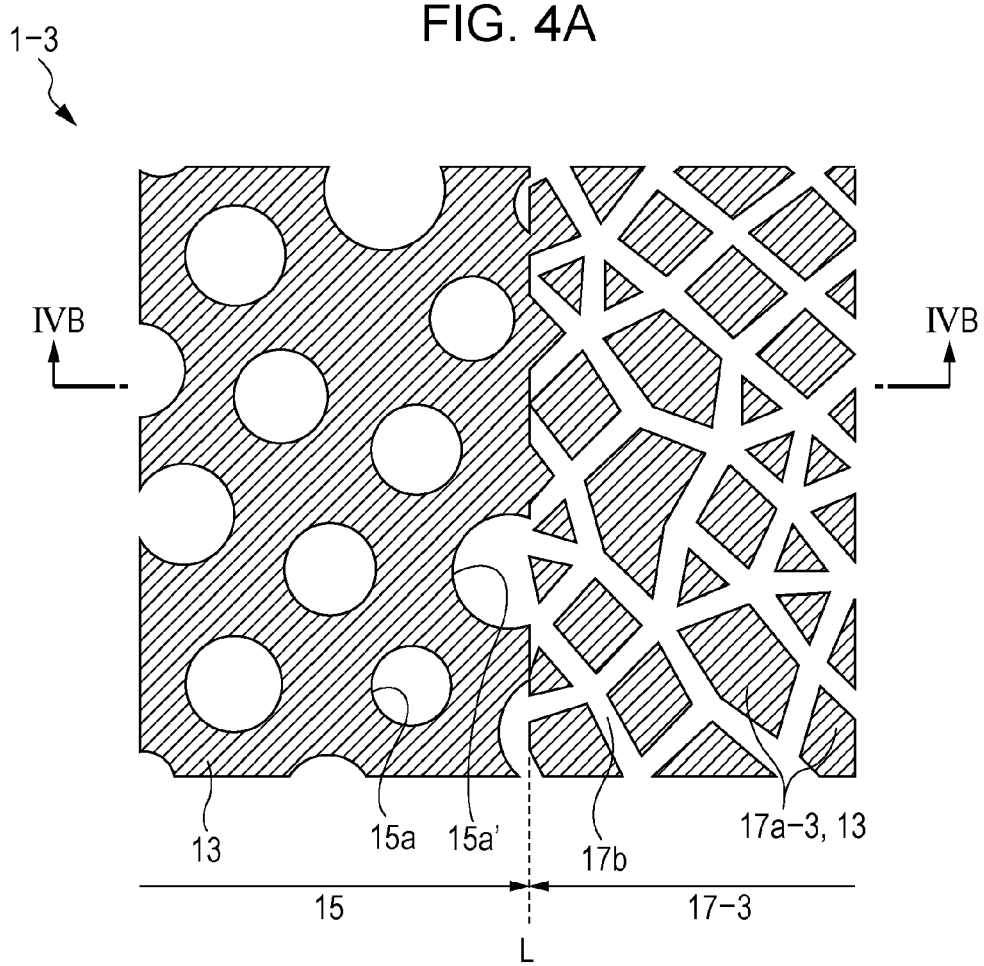
FIG. 4A is an enlarged plan view of a principal portion of a transparent electrode device according to a third embodiment, for description thereof.
Figure 4B:
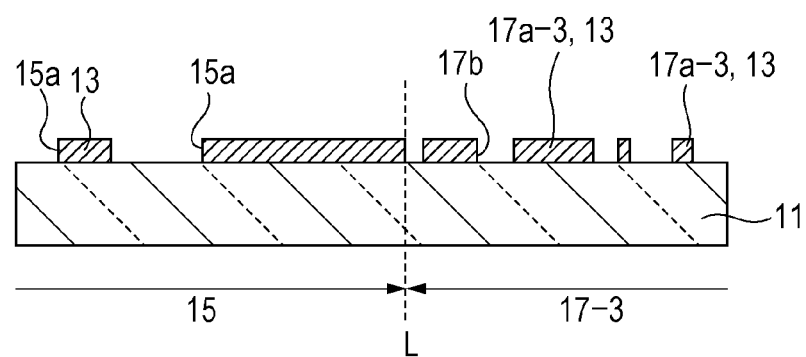
FIG. 4B is a cross-sectional diagram taken along line IVB-IVB in FIG. 4A.

Transparent Electrode Device with Groove Pattern Provided to Insulating Region as Random Pattern FIG. 4A is an enlarged plan view for describing the configuration of a transparent electrode device according to a third embodiment corresponding to the enlarged portion IVA in FIG. 1, and FIG. 4B is a cross-sectional diagram taken along line IVB-IVB in FIG. 4A. A transparent electrode device 1-3 illustrated in FIGS. 4A and 4B differs from the transparent electrode device according to the first embodiment described with reference to FIGS. 2A and 2B with regard to the configuration of a random pattern disposed in an insulating regions 17-3, and other configurations are the same.

That is to say, the insulating regions 17-3 are regions disposed adjacent to the electrode regions 15 in the same way as with the first embodiment, and are provided in a state of filling in between the electrode regions 15 and also insulating between the electrode regions 15. A feature of the insulating regions 17-3 is that the transparent electroconductive film 13 provided to the insulating regions 17-3 forms random mesh patterns divided into independent islands by groove patterns 17*b*, extending in random directions.

That is to say, the insulating regions 17-3 is configured using the transparent electroconductive film 13, and has island patterns 17*a*-3 formed by dividing the transparent electroconductive film 13 by the groove patterns 17*b* extending in random directions, as random patterns. These island patterns 17*a*-3 (i.e., random patterns) are formed by dividing the transparent electroconductive film 13 into random polygons by the groove patterns 17*b* extended in random directions. Note that the groove patterns 17*b* themselves, of which the directions of extending are random, are also random patterns.

Now, the groove patterns 17*b* provided to the insulating regions 17-3 extend in random directions in the insulating regions 17-3, and we will say that the width perpendicular to the direction of extending (hereinafter referred to as "line width") is a constant line width. With the insulating regions 17-3, the covering percentage by the transparent electroconductive film 13 is adjusted by the line width of the groove patterns 17*b*. We will say that this covering percentage is set so as to be around the same as the covering percentage of the electrode regions 15 by the transparent electroconductive film 13. Now, to say that the covering percentage is around the same means that the outer shape of these electrode regions 15 and insulating regions 17-3 is a level which is not visually recognized as being a pattern, for each pitch thereof. Note that adjustment of the covering percentage of the range by line width of the groove patterns 17*b* will be described later in the section regarding the fabrication method of random patterns.

In the electrode regions 15 near the boundary L with the insulating regions 17-3, the hole patterns 15*a*' having the circular patterns thereof divided by the boundary L are randomly situated following the boundary L. On the other hand, in the insulating regions 17-3 near the boundary L with the electrode regions 15, the island patterns 17*a*-3 formed by the groove patterns 17*b* dividing the transparent electroconductive film 13 are randomly situated.

Also, the covering percentage of the electrode regions 15 by the transparent electroconductive film 13 may be partially adjusted to different values. For example, in the event that the width in the direction perpendicular to the electroconductive direction in the electrode regions 15 is not constant, the placement state of the hole patterns 15*a* may be adjusted such that the covering percentage of the transparent electroconductive film 13 increases a portions where the width is narrow, so as to suppress local increase in sheet resistance. This is the same as with the second embodiment.

Suppressing the difference in covering percentage by the transparent electroconductive film 13 to a level where the outer shapes of the electrode regions 15 and insulating regions 17-3 such as described above are not visually recognized as patterns, is the same as with the first embodiment. That is to say, the difference in covering percentage of the electrode regions 15 and insulating regions 17-3 by the transparent electroconductive film 13 is within 30%, and in the event that multiple transparent electrode devices 1-3 have been layered and used, this is to be within a value of the 30% divided by the number of transparent electrode devices 1-3.

Also, the electrode regions 15 may include hole patterns 15*a* with a diameter of 100 μm or greater, the same as with the first embodiment. On the other hand, the insulating regions 17-3 are provided with island patterns 17*a*-3 having a width of 100 μm or greater at the largest portions, to raise the covering percentage by the transparent electroconductive film 13.

Advantages of Third Embodiment

In the same way as with the first embodiment, the transparent electrode device 1-3 described above has hole patterns 15*a* randomly disposed in the transparent electroconductive film 13 making up the electrode regions 15, and island patterns 17*a*-3 configured of the transparent electroconductive film 13 randomly disposed at the insulating regions 17-3. Also, the insulating regions 17-3 includes island patterns 17*a*-3 having a width of 100 μm or greater at the largest portions. Accordingly, advantages the same as with the first embodiment can be obtained.

Additionally, with the transparent electrode device 1-3 according to the third embodiment, the transparent electroconductive film 13 of the insulating regions 17-3 is divided by groove patterns 17*b* extending in random directions. Accordingly, the covering percentage of the transparent electroconductive film 13 in the insulating regions 17-3 can be adjusted over a wide range by the width of the groove patterns 17*b*. Thus, even in the event that the covering percentage of the transparent electroconductive film 13 at the electrode regions 15 is set at a high value to improve electroconductivity, insulating regions 17-3 with a high covering percentage by the transparent electroconductive film 13, around the same level, can be easily set. As a result, both reduction in resistance value of the electrode regions 15 and improvement in visual non-recognition can be realized.

Note that as a modification of the third embodiment, band patterns configured of the transparent electroconductive film 13 where the groove patterns 17*b* described above have been inverted as to the electrode regions 15 may be provided. In this case, hole patterns are formed in portions separated by the band patterns at the electrode regions 15, and these band patterns are in a state extended in random directions. Also, such band patterns of which the direction of extending are random, and hole patterns separated by the band patterns, are also random patterns.

4. Fourth Embodiment

Figure 5A:
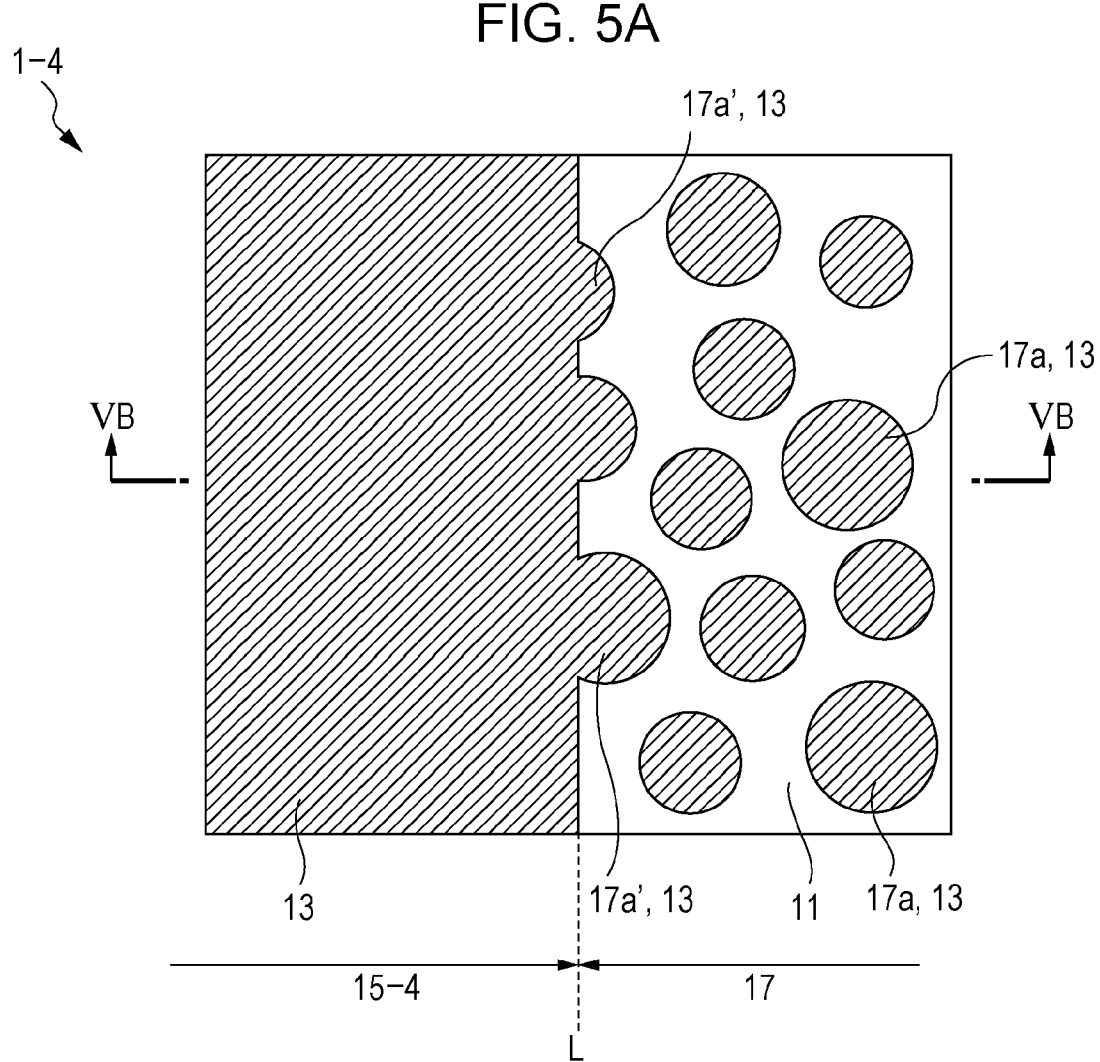
FIG. 5A is an enlarged plan view of a principal portion of a transparent electrode device according to a fourth embodiment, for description thereof.
Figure 5B:
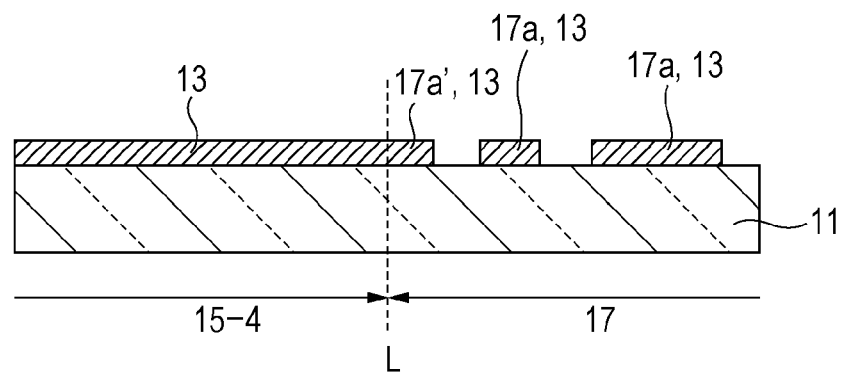
FIG. 5B is a cross-sectional diagram taken along line VB-VB in FIG. 5A.

Transparent Electrode Device with Random Pattern Provided to Insulating Region Alone FIG. 5A is an enlarged plan view for describing the configuration of a transparent electrode device according to a fourth embodiment, corresponding to the enlarged portion VA in FIG. 1, and FIG. 5B is a cross-sectional diagram taken along line VB-VB in FIG. 5A. A transparent electrode device 1-4 illustrated in FIGS. 5A and 5B differs from the transparent electrode device according to the first embodiment described with reference to FIGS. 2A and 2B in that a electrode region 15-4 is configured on a solid film state transparent electroconductive film 13, and other configurations are the same. That is to say, the electrode region 15-4 has the transparent electroconductive film 13 disposed in a solid film state within the region, so the covering percentage by the transparent electroconductive film 13 is 100%.

On the other hand, in the same way as with the first embodiment, the insulating regions 17 have island patterns 17*a* of multiple random sizes including island patterns 17*a* having a diameter of 100 μm or greater, randomly arrayed. Also, in the insulating regions 17 near the boundary L with the electrode region 15-4, the island patterns 17a' formed by the boundary L dividing the circular patterns are randomly situated following the boundary L.

The difference in covering percentage by the transparent electroconductive film 13 for the above electrode region 15-4 and insulating regions 17 is kept to a level where the outer shapes of each are not visually recognized as patterns, which is the same as with the first embodiment. That is to say, the difference in covering percentage (variation) by the transparent electroconductive film 13 at the electrode region 15-4 and insulating regions 17 is 30% or less, and in a case where multiple transparent electrode devices 1-4 are layered and used, the difference value for each transparent electrode devices 1-4 is that obtained by dividing 30% or less by the number of transparent electrode devices 1-4.

With the fourth embodiment, the configuration of the insulating regions 17 as to the electrode region 15-4 where the transparent electroconductive film 13 is formed as a solid film is the same as with the first embodiment, so the setting range of the covering percentage by the transparent electroconductive film 13 in the insulating regions 17 is greater than with the first embodiment. Accordingly, the range of diameter of island patterns 17a disposed in the insulating regions 17 is set so as to be greater than the first embodiment, including island patterns 17a with a diameter of 100 μm or greater.

Advantages of Fourth Embodiment

With the transparent electrode device 1-4 described above, the electrode region 15-4 has the transparent electroconductive film 13 formed as a solid film, but multiple island patterns 17a with a diameter of 100 μm or greater are provided to the insulating regions 17 in the same way as with the first embodiment. Accordingly, while lowering the covering percentage by the transparent electroconductive film 13 at the electrode region 15-4 is not expected, visual recognition of the pattern of the electrode region 15 can be reduced by improving the covering percentage by the transparent electroconductive film 13 at the insulating regions 17. Also, in the same way as with the first embodiment, the transparent electroconductive film 13 is randomly disposed at the boundary L between the insulating regions 17 and electrode region 15-4, whereby effects of making the outline of the electrode region 15-4 less conspicuous can be expected. Also, the effect of suppressing sheet resistance of the electrode region 15-4 to ensure electroconductivity can be most expected with this arrangement.

Note that as a modification of the fourth embodiment, the configuration of the insulating regions 17 may be a configuration where groove patterns are disposed, in the same way as with the third embodiment. In this case as well, advantages the same as with the fourth embodiment can be expected.

5. Method for Fabricating Random Pattern to be Provided to Transparent Electrode Device A method for fabricating the random patterns for the transparent electrode device according to the first through fourth embodiments described above, will be described. Note that the method for fabricating the random patterns described here is but an example, and does not mean that the transparent electrode device according to the present application is restricted to that obtained applying the fabrication method described here.

Generating Random Pattern

First, a random pattern is generated where both randomness of placement and high-density filling are realized at the time of randomly changing the radius of circles within a range of settings, by calculating and situating center coordinates of circles such that adjacent circles are constantly in contact. In this case, a random pattern where high density and uniform random placement is obtained with few calculations, can be obtained by the following algorithms in (1) and (2).

(1) Circles, of which the radii are random within a certain range, are arrayed on an X-axis so as to be in contact. Parameters used here are listed blow.

Xmax: maximum X coordinate value for region for generating circles

Yw: maximum value settings for Y coordinates which the center of a circle situated on the X axis can assume Rmin: minimum radius of generated circle Rmax: maximum radius of generated circle Rnd: random number value obtained within range of 0.0 to 1.0

Pn: circle defined by X coordinate value xn, Y coordinate value yn, and radius rn Now, Rmax is set such that random patterns such as hole patterns and island patterns fabricated based on the random pattern generated here include those with a diameter (maximum width) of 100 μm or greater. Accordingly, if the closest distance (smallest interval) between hole patterns and between island patterns is set to d, $$R\text{max} \geq 100\ \mu\text{m} \times (½) + d \times (½)$$

is set. Note that d, which is the closest distance (smallest interval), is decided by the process controllability at the time of forming the random patterns such as hole patterns and island patterns, for example.

Figure 6:
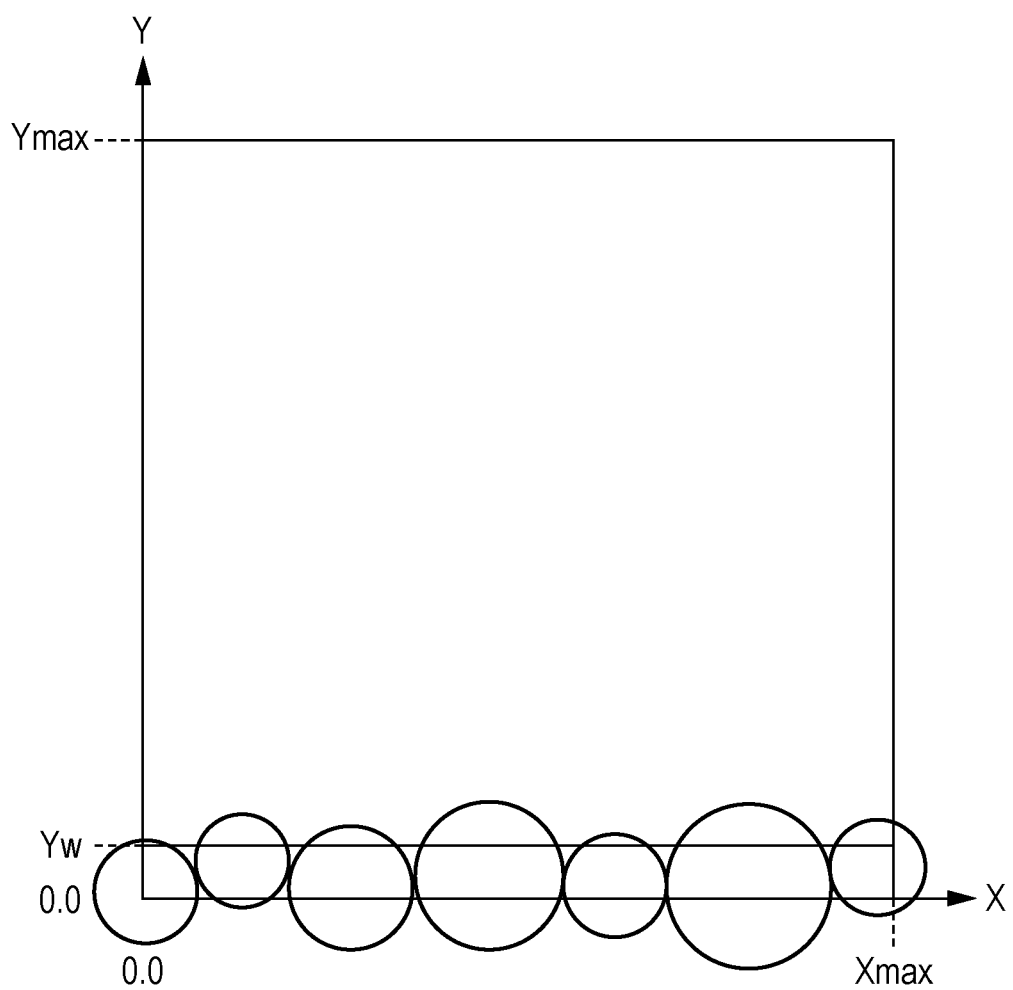
FIG. 6 is a schematic diagram (part 1) for describing an algorithm for generating a random pattern.

FIG. 6 is a schematic diagram for describing the algorithm of (1) above. As shown in FIG. 6, a Y coordinate value is determined randomly from a range from 0.0 which is on the X axis to generally the value of Rmin, and a radius is randomly determined from the range of Rmin to Rmax, so as to obtain a circle, and a circle thus obtained is arrayed so as to come into contact with an already-existing circle, which is repeatedly performed, thereby randomly arraying a row of circles on the X axis.

Figure 7:
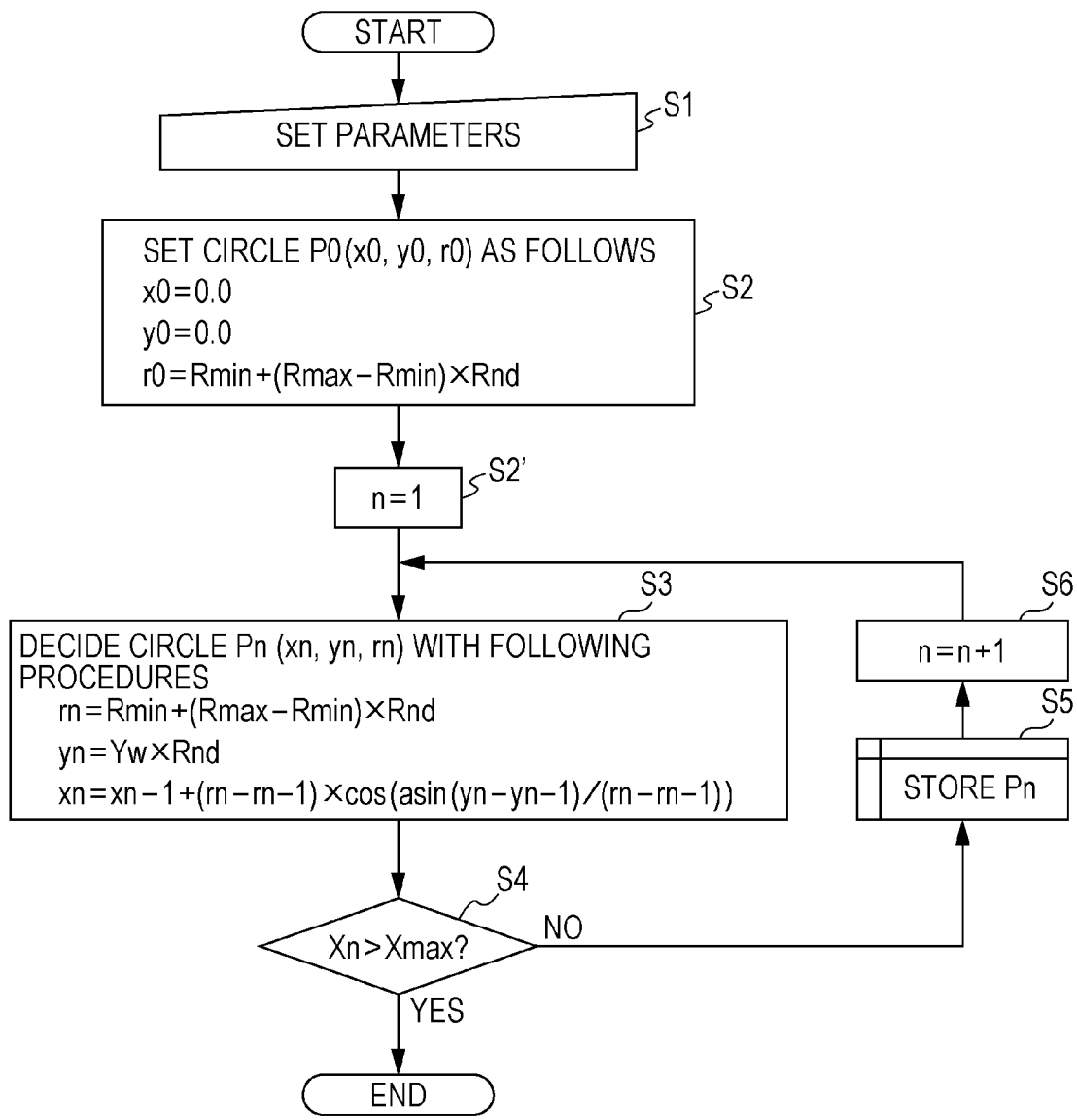
FIG. 7 is a flowchart (part 1) for describing an algorithm for generating a random pattern.

Now, the algorithm in (1) will be described with reference to the flowchart shown in FIG. 7. First, in step S1, appropriate parameters for (1) described above are set.

Next, in step S2, a circle P0(x0, y0, r0) is set as follows.

$$x0 = 0.0$$

$$y0 = 0.0$$

$$r0 = R\text{min} + (R\text{max} - R\text{min}) \times Rnd$$

Subsequently, in step S2', n=1 is set.

Next, in step S3, a circle Pn (xn, yn, rn) is determined by the following expressions.

$$rn = R\text{min} + (R\text{max} - R\text{min}) \times Rnd$$

$$yn = Yw \times Rnd$$

$$xn = xn-1 + (rn - rn-1) \times \cos(a\sin(yn - yn-1)/(rn - rn-1))$$

The radius of the circle Pn is also randomly set by taking the random number value Rnd as a coefficient. Also, the center y coordinate value yn is also randomly set by taking the random number value Rnd as a coefficient within the range of Yw.

Next, in step S4, determination is made regarding whether or not Xn>Xmax holds. In the event that determination is made in step S4 that Xn>Xmax holds, the processing ends since determination is made that placement of circles has already ended up to the greatest value of the X coordinates. In the event that determination is made in step S4 that Xn>Xmax does not hold, the processing advances to step S5.

In step S5, the circle Pn(xn, yn, rn) is stored.

Next, in step S6, the value of n is incremented, and the processing advances to step S3. That is to say, the next circle Pn(xn, yn, rn) is determined (2) A circle of a random radius is determined, and piled up in order from the bottom so as to come into contact with two already-existing circles but not overlap with other circles.

Parameters used here are listed below.

Ymax: maximum Y coordinate value for region for generating circles

Rmin: minimum radius of generated circle

Rmax: maximum radius of generated circle

Rfill: smallest radius in case of setting circle supplementarily, to raise filling percentage Rnd: random number value obtained within range of 0.0 to 1.0

Pn: circle defined by X coordinate value xn, Y coordinate value yn, and radius rn Now, Rmax is the same as described above, and is set such that random patterns such as hole patterns and island patterns fabricated based on the random pattern generated here include those with a diameter (maximum width) of 100 µm or greater.

Figure 8:
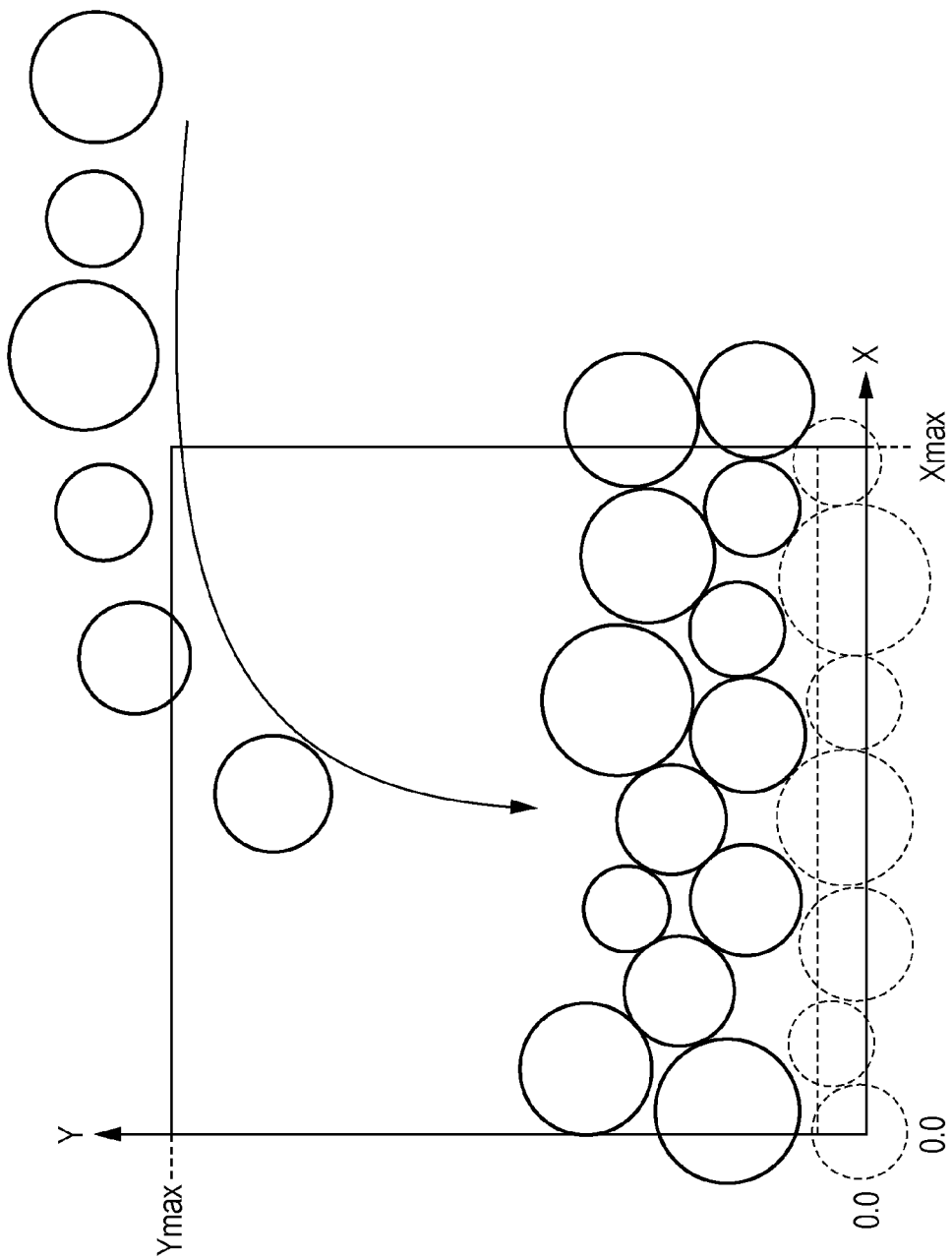
FIG. 8 is a schematic diagram (part 2) for describing an algorithm for generating a random pattern.

FIG. 8 is a schematic diagram for describing the algorithm in (2) described above. As shown in FIG. 8, based on the row of circles (drawn with dotted lines) arrayed on the X axis that have been decided in (1), circles with random radii within the range of Rmin through Rmax are determined, and that with the smallest Y coordinate is placed so as to come into contact with other circles. Also, the gaps can be filled in and the filling percentage improved by setting an Rfill which is smaller than Rmin and using this only in cases where there are gaps which are not filled using the otherwise determined circles, so as to pile up the circles. If no circles smaller than Rmin are to be used, Rfill=Rmin is set.

Figure 9:
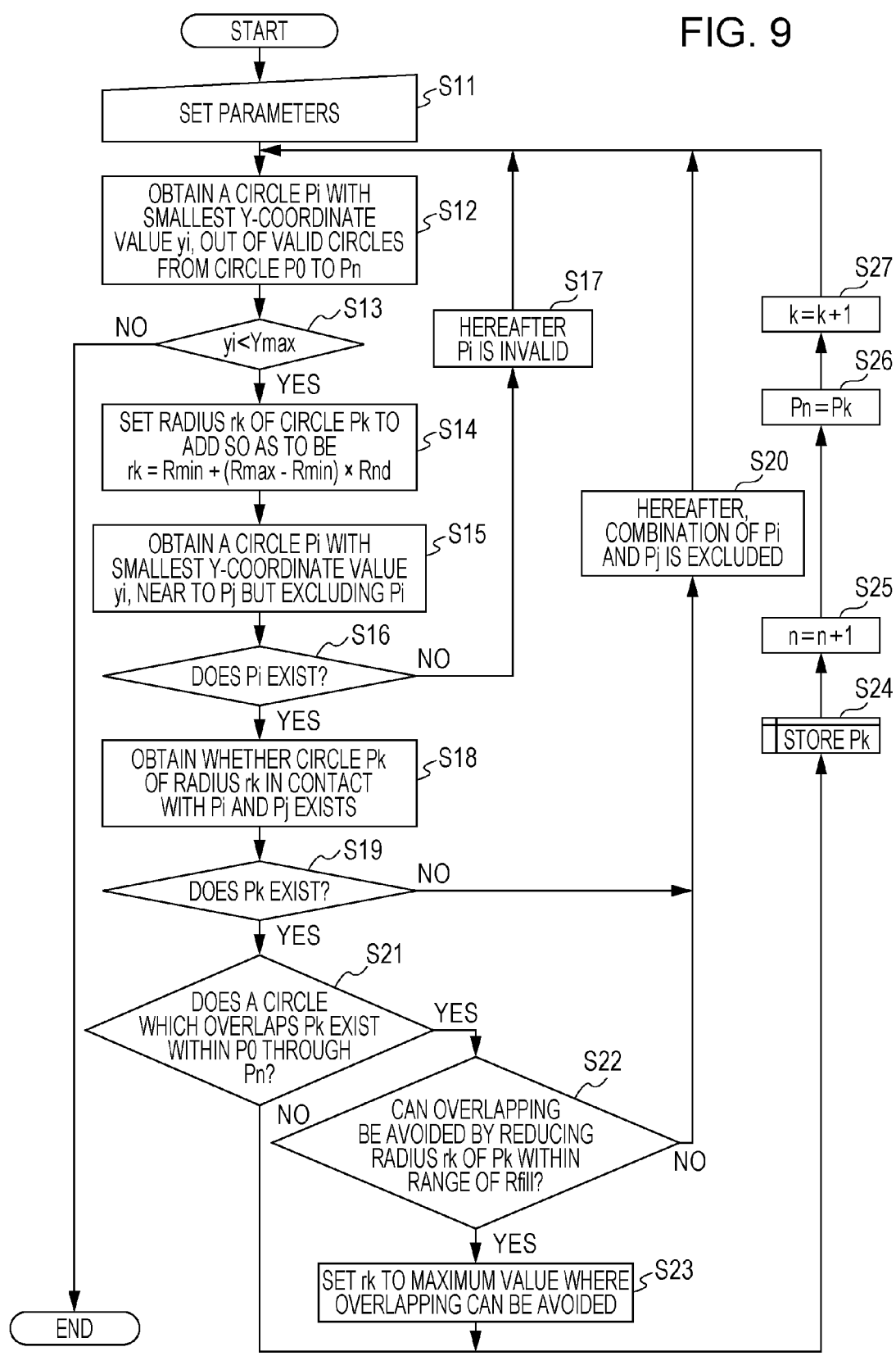
FIG. 9 is a flowchart (part 2) for describing an algorithm for generating a random pattern.

Next, the algorithm in (2) will be described with reference to the flowchart shown in FIG. 9. First, in step S11, appropriate parameters for (2) described above are set.

Next, in step S12, a circle Pi with the smallest Y coordinate value yi is found from the circles P0 through Pn generated in (1).

Next, in step S13, determination is made regarding whether or not yi<Ymax holds. In the event that determination is made in step S13 that yi<Ymax does not hold (NO in step S13), the processing ends, since this means that circles have been stacked up to the maximum Y coordinate value. In the event that determination is made in step S13 that yi<Ymax holds (YES in step S13), the processing advances to step S14.

In step S14, the radius rk of a circle Pk to be added is set according to $$rk = Rmin + (Rmax - Rmin) \times Rnd$$

wherein the radius rk is randomly set due to using the random number value Rnd as a coefficient.

Next, in step S15, a smallest circle Pj with a Y coordinate value of yi, nearby the circle Pi but excluding the circle Pi, is found.

Next, in step S16, determination is made regarding whether or not a smallest circle Pi exists. In the event that determination is made in step S16 that a smallest circle Pi does not exist, the flow advances to step S17 where Pi is invalidated thereafter. In the event that determination is made in step S16 that a smallest circle Pi exists, the flow advances to step S18 where determination is made regarding whether or not a circle Pk having a radius rk which comes into contact with circle Pi and circle Pj exists.

Figure 10:
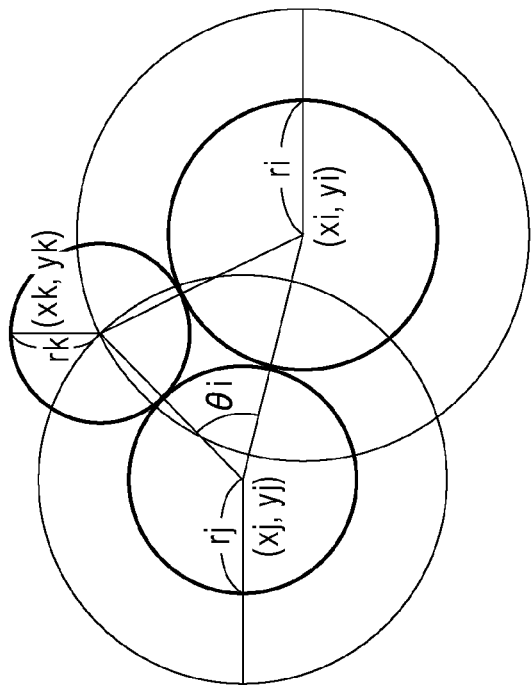
FIG. 10 is a schematic diagram (part 3) for describing an algorithm for generating a random pattern.

FIG. 10 illustrates a way to obtain coordinates in step S18 such that a circle of an arbitrary radius comes into contact with two circles which are in contact with each other. That is, in the expression shown in FIG. 10, cos θi is obtained using the coordinates (xi, yi) and radius ri of the circle Pi, the coordinates (xj, yj) and radius rj of the circle Pj, and the radius rk of the circle Pk to be added. Further, θi is used to calculate the coordinates (xk, yk) of the circle Pk to be added, with the expression in FIG. 10.

Next, in step S19, determination is made regarding whether or not a circle Pk of a radius rk which comes into contact with circle Pi and circle Pj exists. In the event that determination is made in step S19 that a circle Pk does not exist, in step S20 the combination of circle Pi and circle Pj is excluded thereafter. In the event that determination is made in step S19 that a circle Pk exists, the flow advances to step S21.

In step S21, determination is made regarding whether or not there is exists, in circle P0 through circle Pn, a circle which overlaps with circle Pk. In the event that determination is made in step S21 that a circle which overlaps with circle Pk does not exist, the circle Pk (xk, yk, rk) is stored in step S24.

Next, in step S25, the value of n is incremented, in step S26 Pn=Pk is set, and further in step S27 the value of k is incremented and the flow returns to step S12.

In the event that determination is made in step S21 that a circle which overlaps with circle Pk exists, in step S22 determination is made regarding whether or not overlapping can be avoided by reducing the radius rk of the circle Pk within a range of Rfill or greater. In the event that determination is made in step S22 that overlapping is not avoidable, in step S20 the combination of circle Pi and circle Pj is excluded thereafter.

In the event that determination is made in step S22 that overlapping is avoidable, in step S23 the radius rk is set to the greatest value where overlapping can be avoided.

Next, the circle Pk (xk, yk, rk) is stored in step S24. Subsequently, in step S25, the value of n is incremented, in step S26 Pn=Pk is set, and further in step S27 the value of k is incremented and the flow returns to step S12.

Figure 11A:
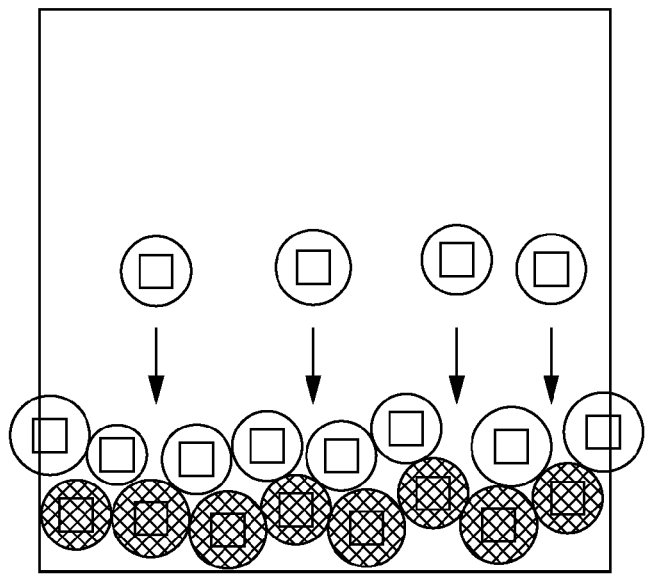
FIGS. 11A and 11B are schematic diagrams conceptually illustrating a method for generating a random pattern.
Figure 11B:
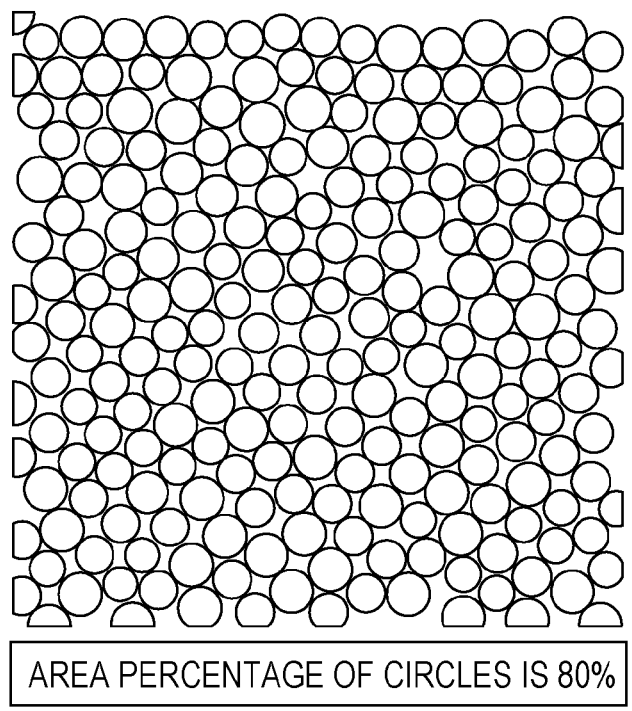

FIG. 11A is a schematic diagram conceptually illustrating a method for generating a random pattern, and FIG. 11B is a diagram illustrating an example of generating a random pattern where the area percentage of circles is 80%. As shown in FIG. 11A, by piling up the circles with the radii thereof randomly changed within the set range (Rmin through Rmax), a random pattern free of regularity which has a high density can be generated.

After the random pattern has been generated as described above, the hole patterns of the electrode regions and island patterns of the insulating regions are fabricated as random patterns, based on the generated random patterns as illustrated in the following examples 1 through 3.

Creating Random Pattern

Example 1

Example of Providing Same Random Pattern for Electrode Regions and Insulating Regions A method for fabricating the hole patterns 15a and island patterns 17a of the transparent electrode device 1-1 according to the first embodiment described with reference to FIGS. 2A and 2B will be described here.

Figure 12A:
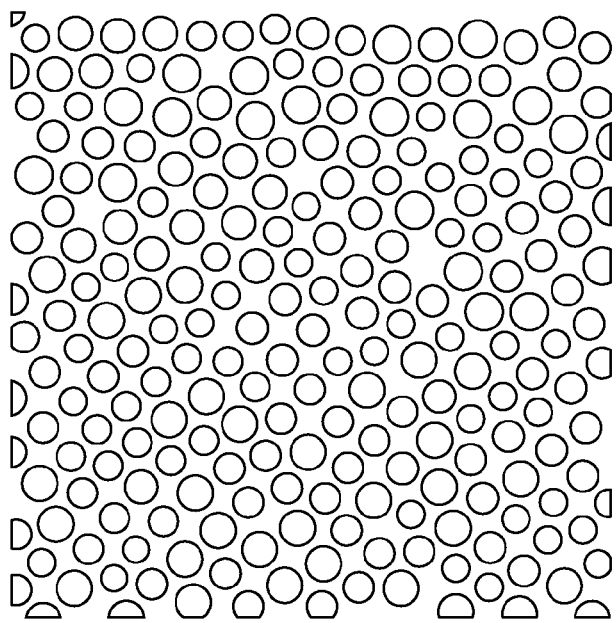
FIGS. 12A and 12B are layout diagrams of random patterns created based on a generating pattern.
Figure 12B:
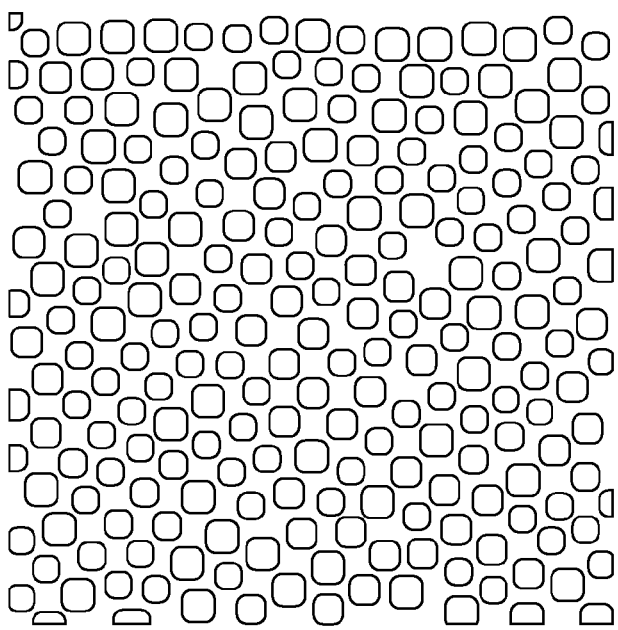

In this case, after generating random patterns such as described above, isolated random patterns such as shown in FIG. 12A are fabricated by reducing the circle radius of the generated random patterns (generated patterns). Also, as shown in FIG. 12B, random patterns which have been isolated by drawing arbitrary shapes within the generated pattern circles, such as square patterns with the corners rounded off, may be fabricated. Examples of shapes drawn within the generated patterns include circles, ellipses, polygons, polygons with corners removed, indeterminate shapes, and so forth.

Next, the isolated random patterns thus fabricated are inverted at the boundary L between the electrode regions 15 and insulating regions 17. Thus, the hole patterns 15a of the electrode regions 15 and island patterns 17a of the insulating regions 17 are fabricated as the same random patterns.

Example 2

Example of Providing Different Random Pattern for Electrode Regions and Insulating Regions A method for fabricating the hole patterns 15a and island patterns 17a of the transparent electrode device 1-2 according to the second embodiment described with reference to FIGS. 3A and 3B will be described here.

Even in a case that the hole patterns 15a in the electrode regions 15 and the island patterns 17a in the insulating regions 17 are to be mutually different random patterns, basically, the random patterns are generated the same as described above. In this case, later-described techniques a. and b. for separately generating random patterns by changing conditions, and later-described techniques c. and d. for separately reducing random patterns generated together, are exemplified.

a. Conditions for generating in "Generating Random Pattern" described above are made to be different for the electrode regions and insulating regions, thereby generating two types of random patterns which are different from each other. The generating conditions to be changed here are the Rmin, Rmax, Fill, and so forth, out of the parameters described in "Generating Random Pattern". Accordingly, a random pattern is generated where the range of radii differs between electrode regions and insulating regions. Subsequently, the radii of the circles of the random patterns separately generated in this way are reduced, thereby generating isolated random patterns with different circle radius ranges for the electrode regions and insulating regions.

b. In "Generating Random Pattern" described above, the weighting as to Rnd (a random number value obtained within the range of 0.0 to 1.0) is made to differ between the electrode regions and insulating regions, thereby separately generating two types of different random patterns. Accordingly, random patterns with different radius frequencies are generated for the electrode regions and insulating regions. Subsequently, the radii of the circles of the random patterns separately generated in this way are reduced, thereby generating isolated random patterns with different radius frequencies for the electrode regions and insulating regions.

Description will be made regarding weight of the random number value Rnd illustrated in b. above. The radii of the circles of the random patterns generated as shown in FIG. 11B are $$\text{Circle radius} = Rmin + (Rmax - Rmin) \times Rnd$$

where Rnd is a random number value obtained within the range of 0.0 to 1.0. by substituting this random number value into a calculation expression so that the calculation results are in a range of 0 to 1, the distribution or radii of circles of the generated random patterns can be weighted.

For example, setting the random number value to $Rnd^3$ allows the distribution of random patterns with small circle radius to be increased. Also, setting the random number value to $Rnd^{1/3}$ allows the distribution of random patterns with large circle radius to be increased, whereby the filling percentage of the patterns can be increased.

Figure 13A:
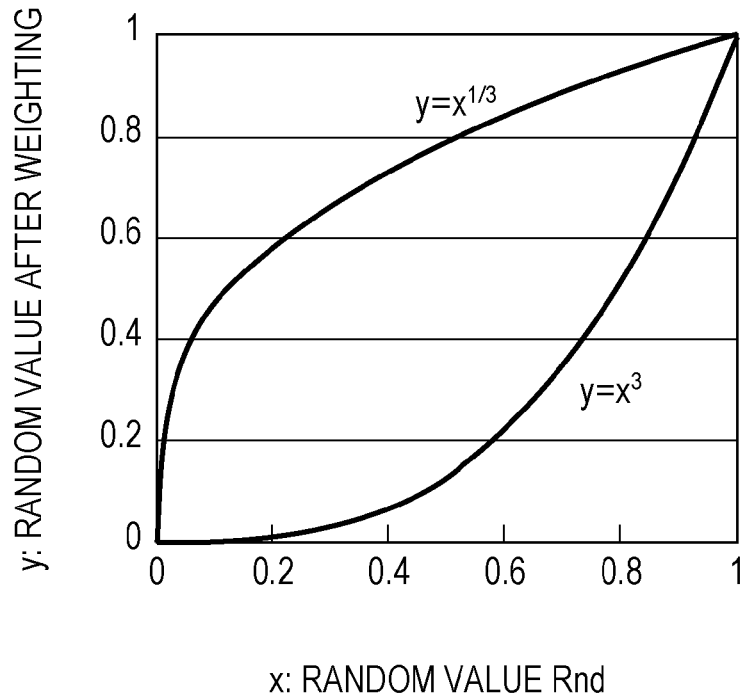
FIGS. 13A and 13B are explanatory diagrams of weighting of random number values in the generating of random patterns.
Figure 13B:
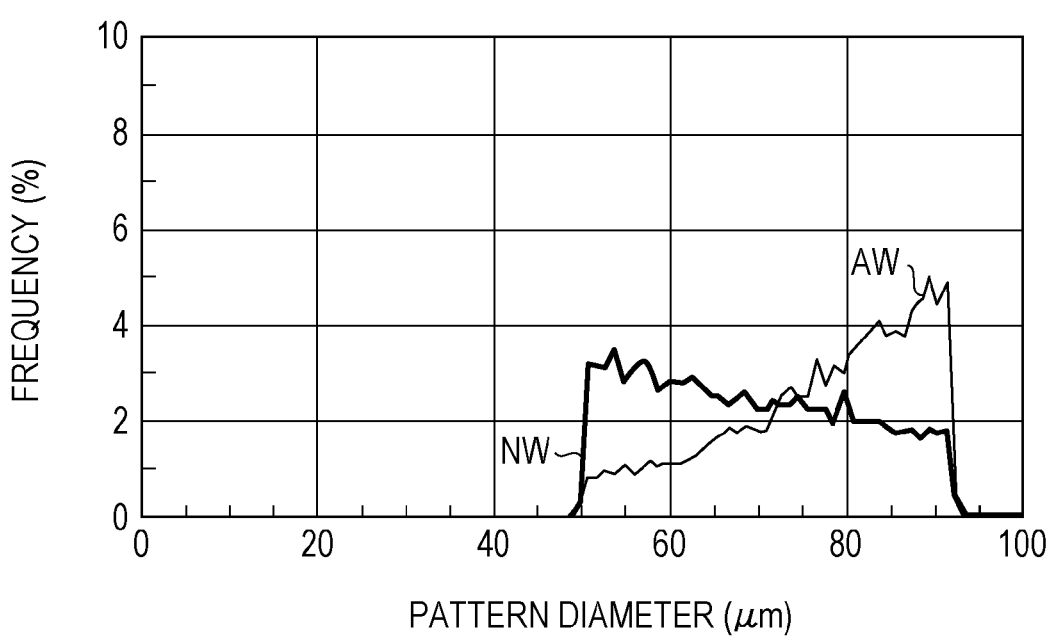

FIG. 13A illustrates the random number values after weighting of $y=x^{1/3}$ and $y=x^3$, respectively. FIG. 13B illustrates the frequency distribution of diameters of fabricated circular random patterns. The line NW illustrates a case of frequency distribution with no weighting, and the line AW illustrates a case of frequency distribution with weighting of $y=x^{1/3}$, in increments of 1 µm in diameter. Note that this frequency distribution is for circular random patterns generated and reduced under the following conditions.

Radius range: Rmin=35 µm through Rmax=56 µm
Radius reduction: 10 µm

As can be seen in FIG. 13B, increasing the occurrence frequency of patterns with a large diameter by weighting with the random number value Rnd enables the pattern filling percentage to be raised. On the other hand, increasing the occurrence frequency of patterns with a small diameter enables the pattern filling percentage to be lowered. It should be noted though, that increasing the frequency of an arbitrary diameter too much results in loss of randomness, and moiré and diffracted light occur more readily. With a frequency distribution of 1 µm diameter, the frequency of an arbitrary diameter is preferably within 35%.

c. The reduction ratio of the radii of circles in random patterns generated at the same time is made to differ between the electrode regions and insulating regions. Accordingly, isolated random patterns with different radius ranges are created for the electrode regions and insulating regions.

d. The shapes drawn within random patterns generated at the same time is made to differ between the electrode regions and insulating regions, and the reduction ratio of the radii of circles in the generated random patterns is made to differ between the electrode regions and insulating regions. For example, one may be circles and the other squares, or the like. Accordingly, isolated random patterns with different shapes are created for the electrode regions and insulating regions.

It goes without saying that combinations may be made of the above a. through d.

(3) fabricating transparent electrode device having groove patterns as random patterns in insulating region Description will be made here regarding fabricating the insulating regions 17-3 in the transparent electrode device 1-3 according to the third embodiment, described with reference to FIGS. 4A and 4B. Note that fabricating of the electrode regions 15 is the same as with the above-described first embodiment.

Figure 14A:
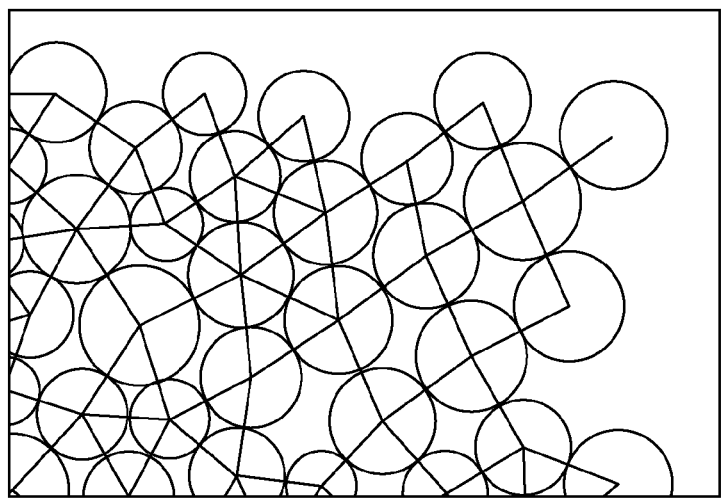
FIGS. 14A through 14C are plan views illustrating procedures for creating groove patterns in an insulating region, in the third embodiment, based on a generating pattern.
Figure 14B:
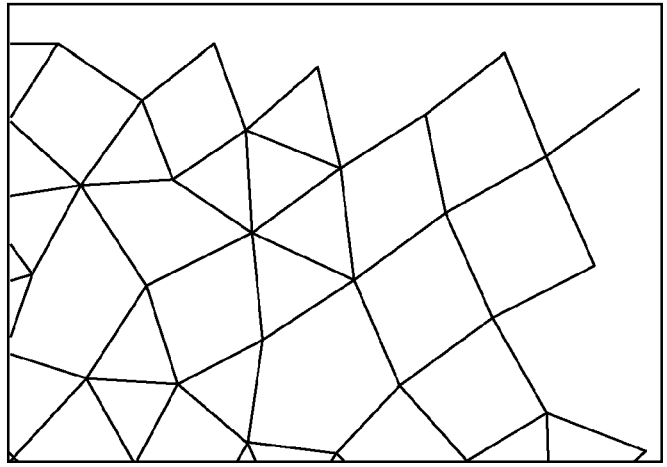

First, random patterns are generated as described above. Next, as shown in FIG. 14A, lines connecting the centers of circles of which the circumferences are in contact are generated in the generated random patterns. Accordingly, random patterns of polygons, configured of the line segments extending in random directions, are generated as shown in FIG. 14B.

Another example of generating polygonal random patterns is to, at the time of drawing the lines passing through the centers of the circles using the center coordinates of each of the circles in the circular random patterns generated above, the lines are randomly determined within a range of rotational angle of 0 degrees through 180 degrees. Accordingly, lines with random inclinations are generated, and random patterns of polygons configured of these lines are generated.

Figure 14C:
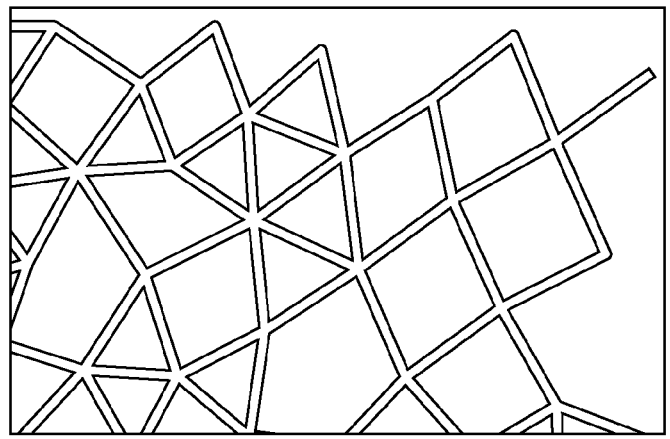

Next, as shown in FIG. 14C, the line segments making up the polygonal random patterns are widened to a predetermined line width, and the widened line segments are taken as the groove patterns 17b of the insulating regions 17-3 shown in FIG. 4A, thereby obtaining the random patterns of the insulating regions 17-3.

Figure 15:
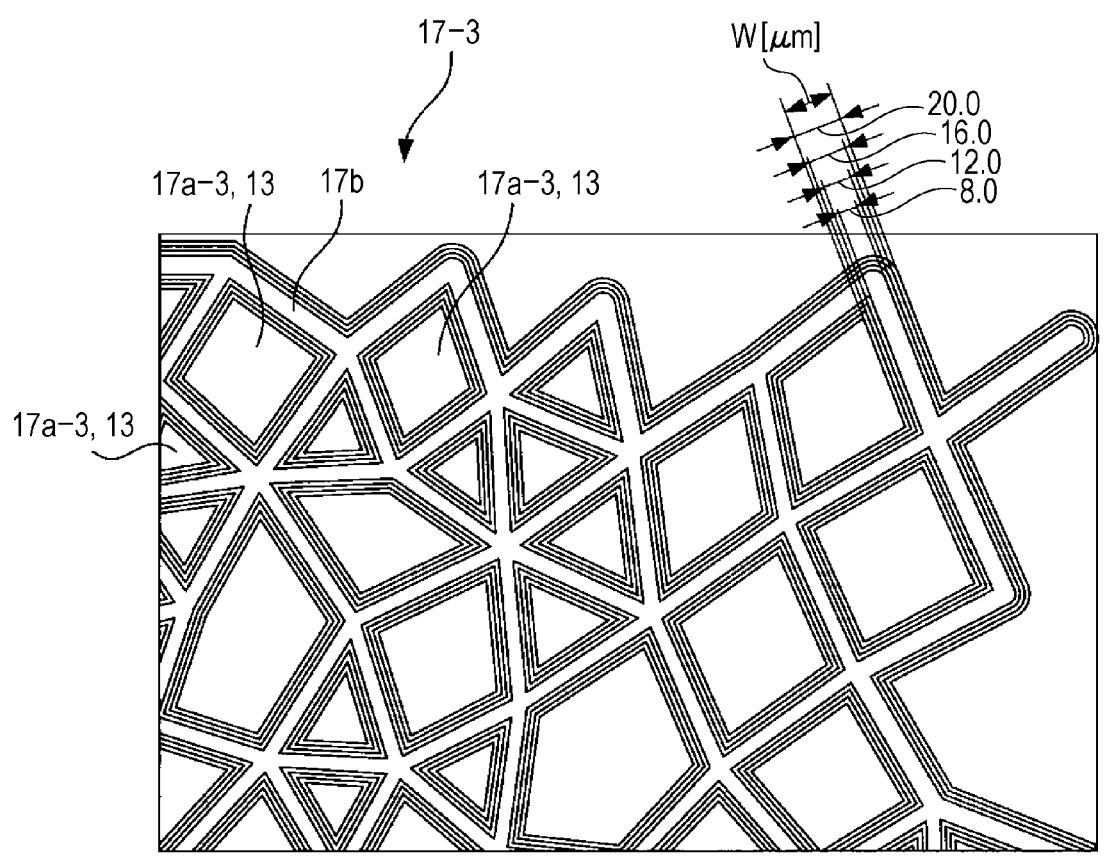
FIG. 15 is a plan view illustrating change of width of groove patterns.

As shown in FIG. 15, the groove patterns 17b can be changed to various line widths W. Changing the line width W of the groove patterns 17b allows the covering percentage of the insulating regions 17-3 by the transparent electroconductive film 13 divided by the groove patterns 17b to be adjusted over a wide range. The following Table 2 illustrates the results of calculating the covering percentage (%) of the insulating regions 17-3 by the transparent electroconductive film 13 for each radius r range (Rmin through Rmax) of circles generated as random patterns, and each line width W of the groove patterns 17b.

TABLE 2

| Line Width W | Covering percentage [%] | | |
|---|---|---|---|
| (μm) | r = 25-45 μm | r = 20-35 μm | r = 20-25 μm |
| 8 | 74.9 | 68.9 | 65.5 |
| 12 | 64.0 | 55.8 | 51.2 |
| 16 | 54.0 | 44.4 | 38.8 |
| 20 | 45.1 | 34.6 | 28.5 |

As can be seen from the above Table 2, with the insulating regions 17-3 in which the transparent electroconductive film 13 is divided by the groove patterns 17b, the covering percentage by the transparent electroconductive film 13 can be adjusted over a wide range of 28.5% to 74.9%.

On the other hand, in a case of taking the same random pattern of the hole patterns 15a of the electrode regions 15 shown in FIG. 2A, for example, as the island patterns 17a of the insulating regions 17, the covering percentage of the insulating regions 17 by the transparent electroconductive film 13 is calculated by the following calculation of having a limit value of around 70% maximum.

That is to say, in the event of arraying circles in a certain region, the maximum value for the filling percentage of circles is a logical maximum value of 90.7, obtained with the circles in a staggered array. Now, if we say that the radius of the circles is 50 μm, and an interval of 8 μm is provided between the circles so that the circles are all isolated, the radius of the circles is reduced to (50−8/2)=46 μm. In this state, the area ratio of the circlers is (46×46)/(50×50))=0.846, so the filling percentage of the circles is (90.7%)×(0.846) =76.7%.

Now, in the event that the radius of each circle is random, the gap between the circles will be even wider, so the actual filling percentage will be a value between the filling percentage with a staggered array (90.7%) and the filling percentage with a grid array (78.5%). This value will differ depending on the ratio (distribution) of greatest radius and smallest radius of the randomly generated circles, but generally will be around 80% or so.

Accordingly, we will say that the radius r of the circles initially generated as a random pattern is Rmin 50 μm to Rmax 100 μm, and an interval of 8 μm is provided between the circles. In this case, the filling percentage of the circles is between 80%×(46×46)/(50×50))=67.71% and 80%×(96× 96)/(100×100))=73.73%. Even if the distribution of randomly generated circles is shifted to somewhat larger circles, around 70% is obtained as a limit value for the filling percentage. It can be seen that the limit value of around 70% for the filling percentage is lower than the covering percentage of 74.9% calculated for the insulating regions 17 where the transparent electroconductive film 13 is divided by the groove patterns 17b.

6. First Method for Manufacturing Transparent Electrode Device (Method Using Master)

Next, a manufacturing method using a master will be described as a first manufacturing method of the transparent electrode device described with the first through fourth embodiments.

Master

Figure 16A:
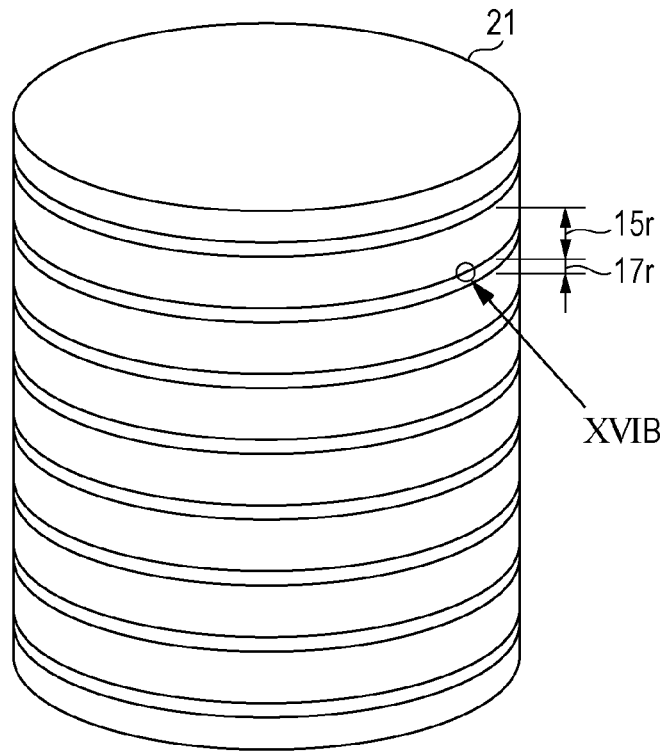
FIGS. 16A and 16B are diagrams illustrating the configuration of a master used with a first manufacturing method of a transparent electrode device according to the present application.
Figure 16B:
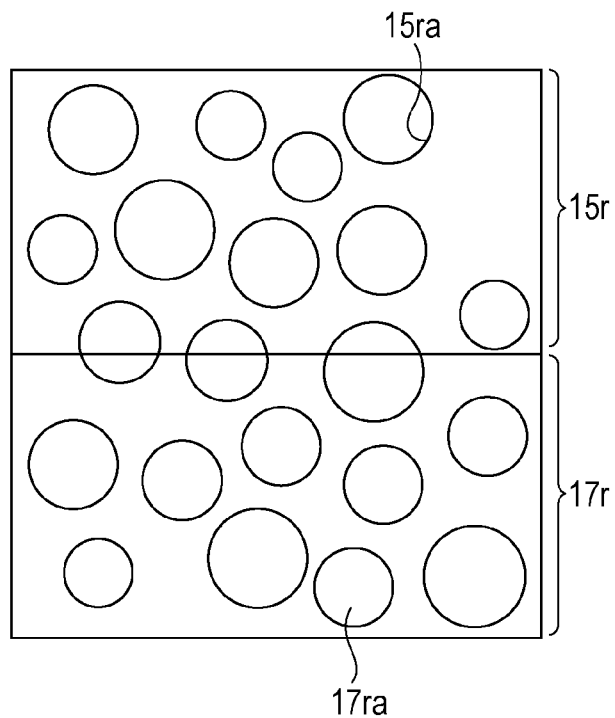

FIG. 16A is a perspective view illustrating an example of the form of a master used with the first manufacturing method. FIG. 16B is a plan view illustrating a portion of an electrode region formation portion 15r and an insulation region formation portion 17r indicated in FIG. 16A as "enlarged portion XVIB", in an enlarged manner. A master 21 is a roll master having a cylindrical face (wall face) serving as a transfer face, with electrode region formation portions 15r and insulation region formation portions 17r alternately filling the face of the cylinder.

Multiple recessed hole portions 15ra are formed in the electrode region formation portions 15r, in a manner distanced from each other. These hole portions 15ra are portions for forming hole patterns in the electrode regions of the transparent electrode device by printing. Also, protruding portions between the hole portions 15ra in the electrode region formation portions 15r are portions for forming the transparent electroconductive film to be disposed in the electrode regions, by printing. Note that in the event that the master 21 is a master to be used for manufacturing the transparent electrode device 1-4 described with reference to FIGS. 5A and 5B, the electrode region formation portions 15r can be a printing face with the same height, and with no hole portions 15ra provided to the electrode region formation portions 15r.

Protruding island portions 17ra are formed in the insulation region formation portions 17r, in a manner distanced from each other. These island portions 17ra are portions for forming island patterns in the insulating regions of the transparent electrode device by printing. These island portions 17ra have the same height as the protruding portions of the electrode region formation portions 15r. Also, recessed portions between the island portions 17ra in the insulation region formation portions 17r are portions for separating the island patterns in the insulating regions. Note that in the event that the master 21 is a master to be used for manufacturing the transparent electrode device 1-3 described with reference to FIGS. 4A and 4B, the recessed portions between the island portions 17ra in the insulation region formation portions 17r are portions for forming the groove patterns.

Manufacturing Procedures for Transparent Electrode Device

Figure 17A:
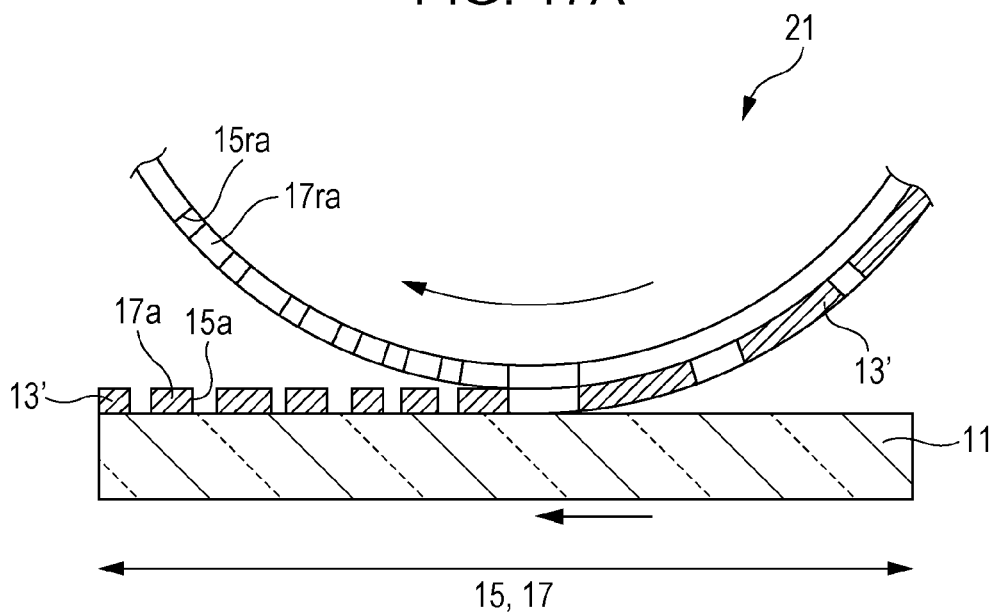
FIGS. 17A and 17B are cross-sectional process drawings for describing the first manufacturing method of a transparent electrode transparent electrode device according to the present application, using the master.
Figure 17B:
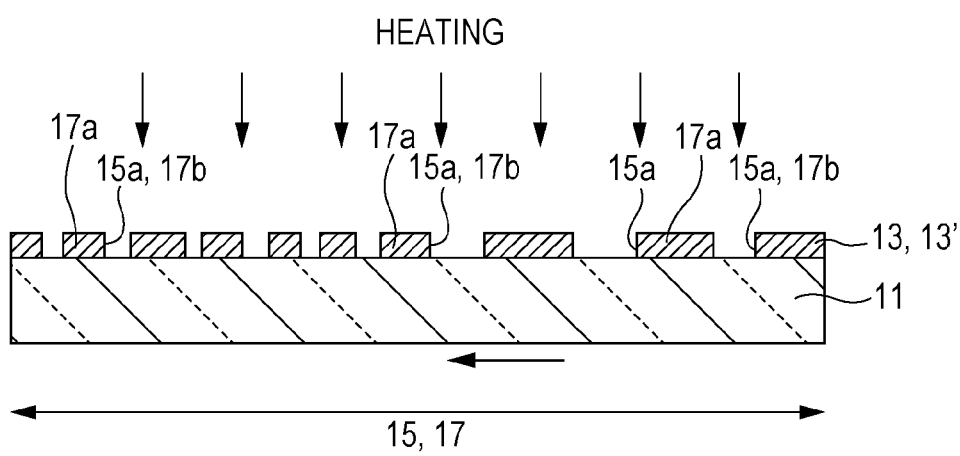

FIGS. 17A and 17B are cross-sectional process drawings for describing the first manufacturing method of a transparent electrode device using the master 21 described above. The procedures of the first manufacturing method will be described next based on these drawings.

As shown in FIG. 17A, electroconductive ink 13' is applied to the transfer face of the master 21, and the applied electroconductive ink 13' is printed onto the face of the substrate 11. Printing methods which can be used include screen printing, waterless lithograph printing, flexographic printing, gravure printing, gravure offset printing, reversal offset printing, and so forth. Next, as shown in FIG. 17B, the electroconductive ink 13' printed on the face of the substrate 11 is heated as appropriate, thereby drying and/or baking the electroconductive ink 13', so as to obtain the transparent electroconductive film 13. Accordingly, an intended one of the transparent electrode devices according to the first through fourth embodiments can be obtained.

7. Second Method for Manufacturing Transparent Electrode Device (Method Applying Pattern Etching)

Next, a manufacturing method applying pattern etching will be described as a second manufacturing method of the transparent electrode device described with the first through fourth embodiments.

Figure 18A:
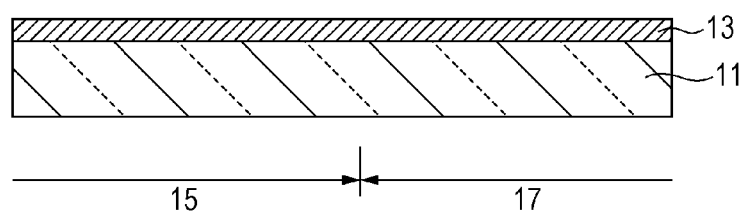
FIGS. 18A through 18D are cross-sectional process drawings for describing a second manufacturing method of a transparent electrode transparent electrode device according to the present application.

First, as shown in FIG. 18A, a transparent electroconductive film 13 is formed on the face of the substrate 11 where a electrode region 15 and a insulating region 17 have been set.

If a metal oxide is used for the transparent electroconductive film 13, the transparent electroconductive film 13 is formed by a method selected as appropriate from CVD (Chemical Vapor Deposition) and PVD (Physical Vapor Deposition). Examples of CVD which can be applied include thermal CVD, plasma CVD, photo-excited CVD, and so forth. Examples of PVD which can be applied include vacuum deposition, plasma-assisted deposition, sputtering, ion plating, and so forth. The substrate 11 may be heated as appropriate when forming the transparent electroconductive film 13.

After formation of the transparent electroconductive film 13, the transparent electroconductive film 13 is subjected to annealing processing as appropriate. Thus, the transparent electroconductive film 13 becomes a mixed state of amorphous and polycrystalline, or a polycrystalline state, thereby improving the electroconductivity of the transparent electroconductive film 13. On the other hand, if metal nanowires are used for the transparent electroconductive film 13, a coating method is applied to form the transparent electroconductive film 13 with metal nanowires dispersed in a dispersion fluid.

Figure 18B:
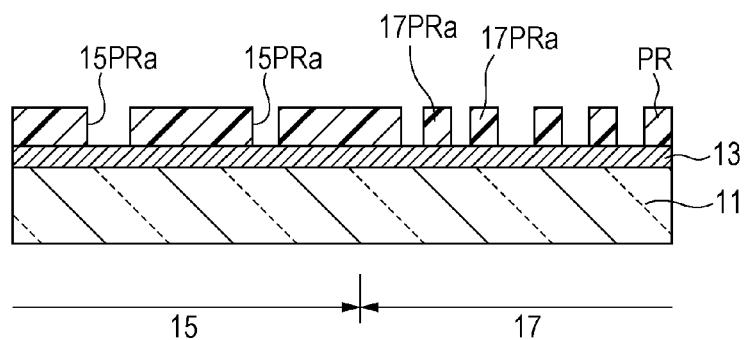

Next, as shown in FIG. 18B, a resist pattern PR is formed on the face of the transparent electroconductive film 13 by lithography. Here, pattern exposure is performed using a photo mask with random patterns, created following the above-described method, having been formed therein.

The resist pattern PR has multiple isolated hole patterns 15PRa at portions corresponding to the electrode region 15. The hole patterns 15PRa are formed corresponding to the hole patterns formed in the transparent electroconductive film 13 at the electrode region 15. Note that if the transparent electrode device to be formed here is the transparent electrode device 1-4 described with reference to FIGS. 5A and 5B, the hole patterns 15PRa are not formed to the resist pattern PR at the electrode region.

Also, the resist pattern PR has multiple isolated island patterns 17PRa at portions corresponding to the insulating regions 17. The island patterns 17PRa are formed corresponding to the island patterns formed in the transparent electroconductive film 13 at the insulating regions 17. Note that if the transparent electrode device to be formed here is the transparent electrode device 1-3 described with reference to FIGS. 4A and 4B, groove patterns extending in random directions are formed to the resist pattern PR at the insulating region.

The resist material making up the resist pattern PR may be either organic resist or inorganic resist, for example. Examples of organic resist that can be used include novolac resist and chemically-amplified resist. Examples of inorganic resist that can be used include metal compounds made up of one type or two or more types of transition metals.

Figure 18C:
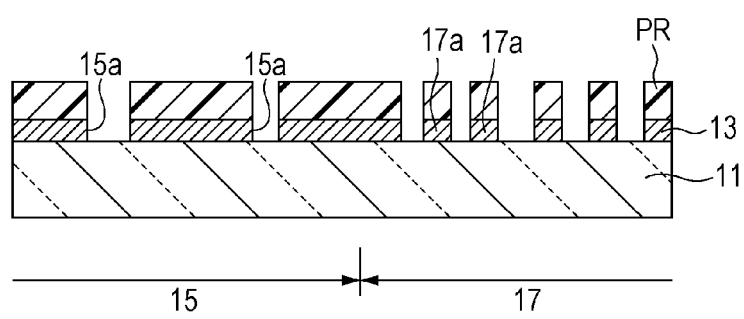

Next, as shown in FIG. 18C, the resist pattern PR is used as a mask to perform pattern etching of the transparent electroconductive film 13. Accordingly, the hole patterns 15a are formed on the transparent electroconductive film 13 at the electrode region 15, and the island patterns 17a are formed in the transparent electroconductive film 13 at the insulating region 17. Pattern etching of the transparent electroconductive film 13 can be performed using either dry etching or wet etching, for example, but wet etching is more preferably from the point that simpler facilities will suffice. Note that in the event that no hole patterns are formed in the resist pattern PR at the portion corresponding to the electrode region 15, no hole patterns 15a are formed in the transparent electroconductive film 13 at the electrode region 15.

Figure 18D:
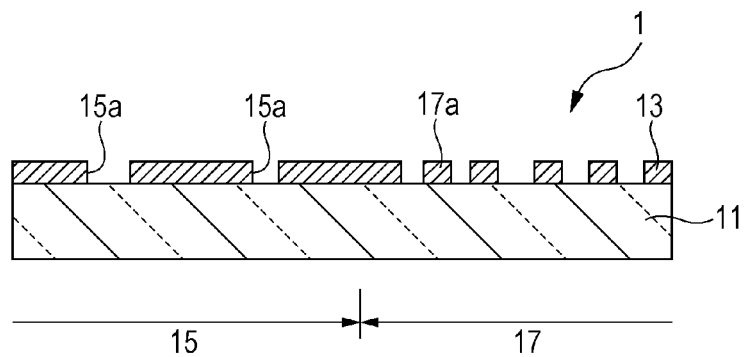

Thereafter, as shown in FIG. 18D, the resist pattern PR formed on the transparent electroconductive film 13 is removed by ashing or the like, thereby obtaining one of the transparent electrode devices according to the first through fourth embodiments, having the intended random patterns.

8. First Through Fourth Modifications of Transparent Electrode Device

FIGS. 19A through 19D are cross-sectional views illustrating first through fourth modifications of the transparent electrode device according to the present application. While FIGS. 19A through 19D illustrate the modifications having been made to he transparent electrode device 1-1 according to the first embodiment, these modifications may be made in the same way to the transparent electrode devices according to the other embodiments.

First Modification

Figure 19A:
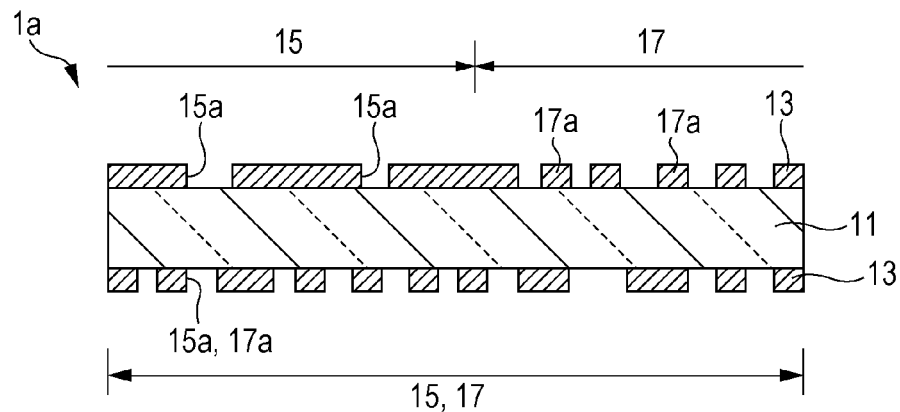
FIGS. 19A through 19D are cross-sectional diagrams illustrating first through fourth modifications of the transparent electrode device according to the present application.

FIG. 19A illustrates, as a modification of the transparent electrode device, the configuration of a transparent electrode device 1a provided with the transparent electroconductive film 13 on both faces of the substrate 11. Transparent electroconductive films 13 with the electrode regions 15 and insulating regions 17 are provided on both faces of the substrate 11. Here, electrode regions 15 are arrayed on the x direction on a first face of the substrate 11 for example, and insulating regions 17 are arrayed in a state of filling in between these electrode regions 15. On the other hand electrode regions 15 are arrayed on the y direction on a second face of the substrate 11, and insulating regions 17 are arrayed in a state of filling in between these electrode regions 15.

The transparent electrode device 1a with the electrode regions 15 arrayed orthogonally in the x-y directions across the substrate 11 in this way can be used as an information input device, as described later. Such a transparent electrode device 1a is of a configuration where two transparent electrode devices are layered sharing a single substrate 11. Accordingly, it is important that the added covering percentages of the transparent electroconductive films 13 at each portion where the transparent electrode devices have been layered are within 30% difference (variation) at the faces of the substrate 11. Specifically, the difference of added values of covering percentage by the transparent electroconductive film 13 in the layered direction should be within 30% for the layered portions of electrode region 15 and electrode region 15, the layered portions of electrode region 15 and insulating region 17, and the layered portions of insulating region 17 and insulating region 17.

Note that, in the case of applying the second embodiment described with reference to FIGS. 5A and 5B to this first modification, the transparent electroconductive film 13 can be provided as a solid film to the electrode region 15 of at least one face of the substrate 11.

Second Modification

Figure 19B:
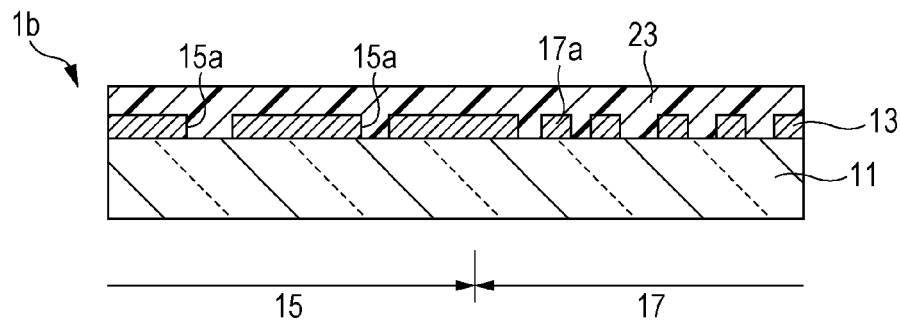

FIG. 19B illustrates the configuration of a transparent electrode device 1b upon which a hard coat layer 23 covering the transparent electroconductive film 13 has been provided, as a second modification of the transparent electrode device. The hard coat layer 23 is, in the case of using a plastic substrate for the substrate 11, for preventing scratching of the substrate 11, providing chemical resistance, suppressing precipitation of low-molecular-weight substances such as oligomers, and also for protecting the transparent electroconductive film 13.

As for the material making up such a hard coat layer 23, ionizing radiation hardening resin which hardens under light or electron beams or the like, or thermo-hardening resin which hardens under heat, is preferable, with photosensitive resin which hardens under ultraviolet rays being most preferable. Examples of such photosensitive resin include acrylate resins such as urethane acrylate, epoxy acrylate, polyester acrylate, polyol acrylate, polyether acrylate, melamine acrylate, and so forth. For example, a urethane acrylate resin product is obtained by reacting polyester polyol with an isocyanate monomer or prepolymer, and reacting the obtained product with an acrylate or methacrylate monomer bearing a hydroxyl group. The thickness of the hard coat layer is preferably 1 μm to 20 μm, but is not restricted in particular to this range.

The hard coat layer 23 is formed by applying a hard coat coating material on the substrate 11. The coating method is not restricted in particular, and coating methods according to the related art can be used. Examples of coating methods according to the related art include micro gravure coating, wire bar coating, direct gravure coating, die coating, dipping, spray coating, reverse roll coating, curtain coating, comma coating, knife coating, spin coating, and so forth. The hard coat coating material includes, for example, resin raw material such as bifunctional or higher monomer and/or oligomer, photopolymerization initiator, and solvent. The solvent is volatized by drying the hard coat coating material coated on the substrate 11. Subsequently, the hard coat coating material dried on the substrate 11 is hardened by irradiation of ionizing radiation or heating, thereby obtaining the hard coat layer 23. Note that this hard coat layer 23 may also be formed on a face of the substrate 11 where the transparent electroconductive film 13 is not provided, as well.

Third Modification

Figure 19C:
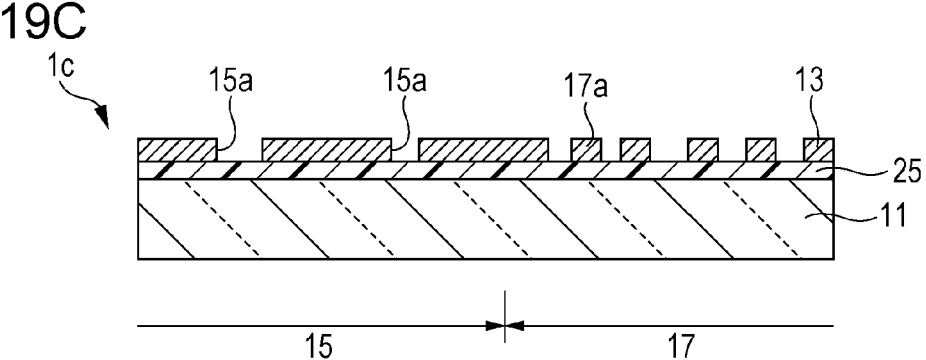

FIG. 19C illustrates, as a third modification of the transparent electrode device, the configuration of a transparent electrode device 1c provided with a foundation layer 25 provided between the substrate 11 and the transparent electroconductive film 13. The foundation layer 25 has, for example, optical adjustment functions and adhesion assisting functions.

The foundation layer 25 having optical adjustment functions is a layer for assisting with the visual non-recognition of the hole patterns 15a and groove patterns 17b formed in the transparent electroconductive film 13. The foundation layer 25 having such optical adjustment functions is configured as a layered body of two layers or more with different refractive indices, and has a low refractive index layer at the side facing the transparent electroconductive film 13. Examples of such an optical adjustment layer are described in Japanese Unexamined Patent Application Publication Nos. 2008-98169, 2010-15861, 2010-23282, and 2010-27294.

The foundation layer 25 having adhesion assisting functions is a layer for ensuring adhesion between the substrate 11 and transparent electroconductive film 13. The foundation layer 25 having such adhesion assisting functions may use, for example, polyacrylic resins, polyamide resins, polyamide-imide resins, polyester resins, chlorides of metal elements, peroxides, alkoxides, and like hydrolysis/dehydration condensation products.

In the event of aiming for ensuring adhesion between the substrate 11 and the transparent electroconductive film 13, processing to assist adhesion may be performed the face of the substrate 11 where the transparent electroconductive film 13 is to be formed, rather than providing the foundation layer 25. Examples of such processing include discharge processing wherein glow discharge or corona discharge is irradiated, and chemical agent processing using an acid or alkali. Also, adhesion after providing the transparent electroconductive film 13 may be improved by calender processing.

Fourth Modification

Figure 19D:
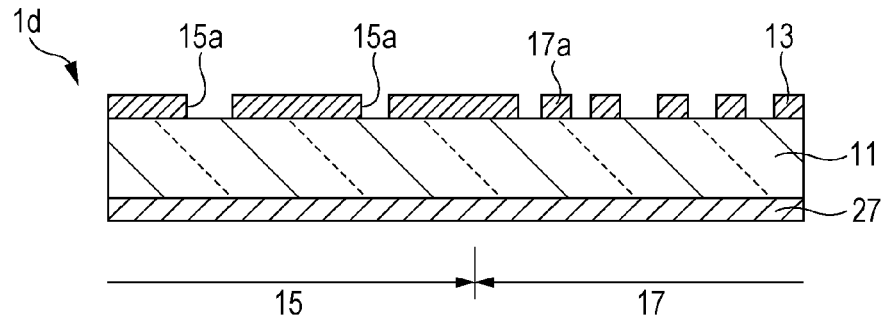

FIG. 19D illustrates as a fourth modification of the transparent electrode device, the configuration of a transparent electrode device 1d provided with a shield layer 27 provided to the substrate 11, on the opposite face from that on which the transparent electroconductive film 13 has been provided. The shield layer 27 is a layer for reducing noise due to electromagnetic waves from the electrode regions 15 formed of the transparent electroconductive film 13.

The material making up the shield layer 27 may be the same as that used for the transparent electroconductive film 13, and the method for forming the shield layer 27 may be the same as that for the transparent electroconductive film 13. Note however, the shield layer 27 is formed on the entire face of the substrate 11 without patterning, and used in this state.

9. Fifth Embodiment

Information Input Device Using Transparent Electrode Device

Figure 20:
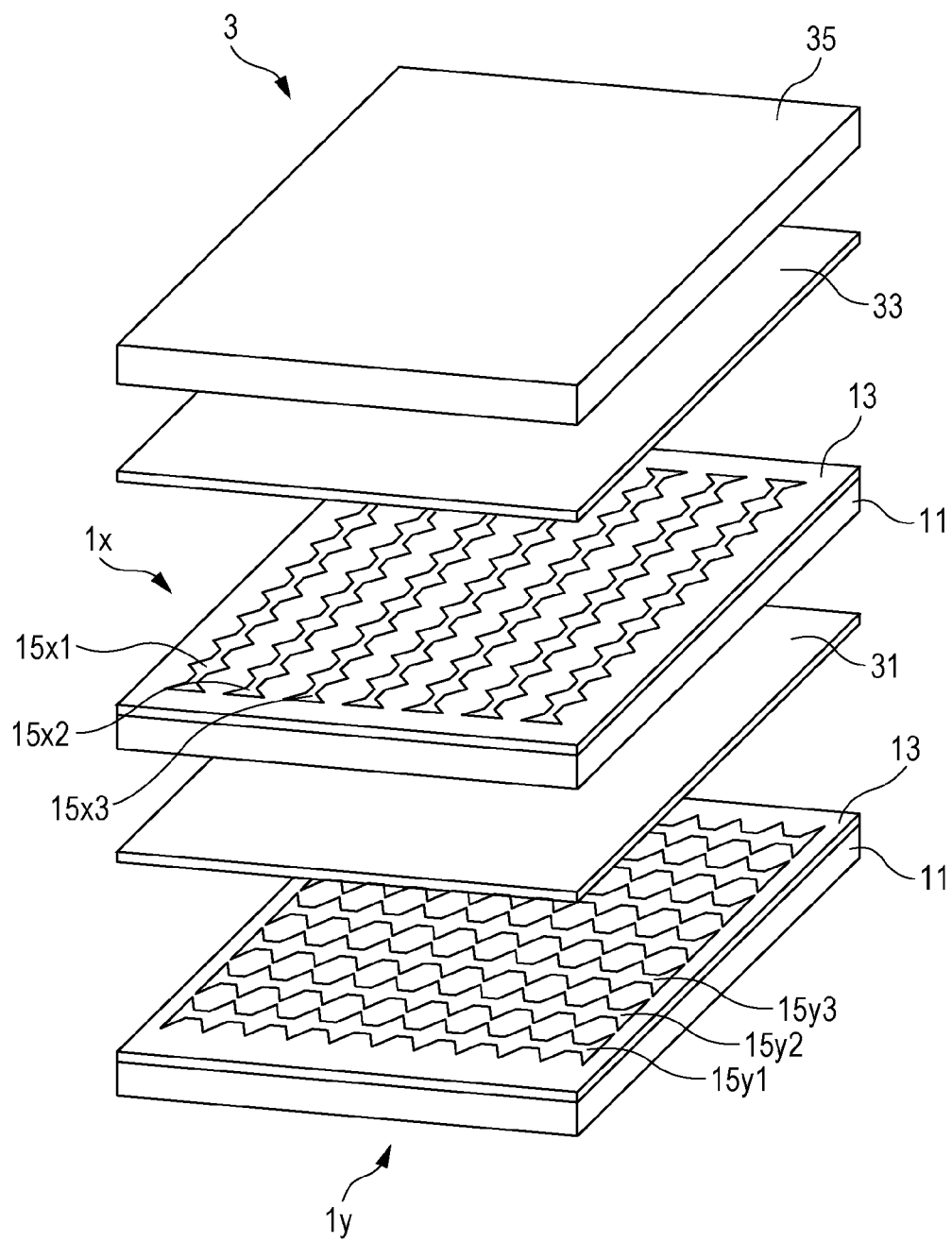
FIG. 20 is a configuration diagram illustrating an example of the configuration of an information input device using the transparent electrode device according to the present application.
Figure 21:
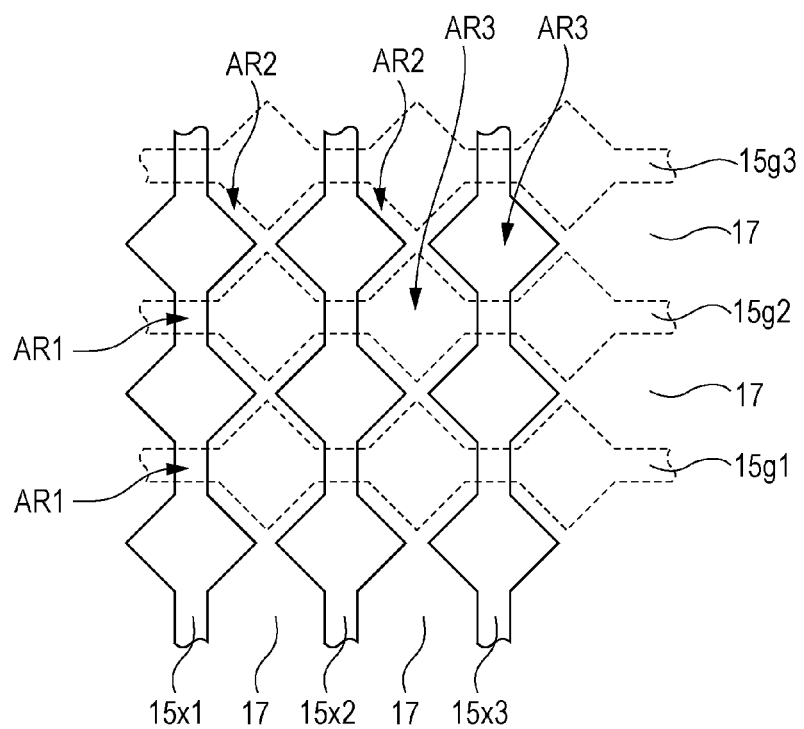
FIG. 21 is an enlarged plan view of principal portions, illustrating an example of the configuration of an information input device using the transparent electrode device according to the present application.

FIG. 20 is a configuration diagram of principal portions of an information input device using transparent electrode devices, and FIG. 21 is a plan view illustrating the layered state of transparent electrode devices in the information input device shown in FIG. 20.

An information input device 3 shown in FIGS. 20 and 21 is a capacitance type touch panel situated on a display screen of a display panel, for example, and is configured using two transparent electrode devices 1x and 1y. These transparent electrode devices 1x and 1y are each any one of the transparent electrode devices described with the first through fourth embodiments with reference to FIGS. 2A through 5B, or any one of the transparent electrode devices according to the second through fourth modifications.

The transparent electrode device 1x is provided with any one of the electrode regions described in the embodiments, as electrode regions 15x1, 15x2, and so forth. On the other hand, the transparent electrode device 1y is provided with any one of the electrode regions described in the embodiments, as electrode regions 15y1, 15y2, and so forth.

The transparent electrode device 1x and transparent electrode device 1y such as described above are situated such that the electrode regions 15x1, 15x2, and so forth, and the electrode regions 15y1, 15y2, and so forth, are situated orthogonally in the x-y directions, and are applied to each other via an adhesive insulating film 31. If the electrode regions 15x1, 15x2, and so forth, and the electrode regions 15y1, 15y2, and so forth, are formed with diamond shapes linked in a straight line, the electrode regions 15x1, 15x2, and so forth, and the electrode regions 15y1, 15y2, and so forth, orthogonally intersect one another at the linkage portion of the diamond shapes.

Alternatively, a transparent electrode device 1a of a configuration where transparent electroconductive films 13 are applied to both faces of the substrate 11 such as described above with the first modification may be used instead of the two transparent electrode devices 1x and 1y applied to each other.

It is important that the added covering percentages of the transparent electroconductive films 13 at each portion where the transparent electrode device 1x and transparent electrode device 1y have been layered are within 30% difference (variation). Specifically, with reference to FIG. 21, it can be seen that the portions where the transparent electrode device 1x and transparent electrode device 1y have been layered can be divided into the following three portions: layered portions AR1 where the electrode regions 15x1, 15x2, and so on, are overlaid with the electrode regions 15y1, 15y2, and so on; layered portions AR2 where the insulating regions 17 overlay each other; and layered portions AR3 where the electrode regions 15x1, 15x2, and so on, or the electrode regions 15y1, 15y2, and so on, are overlaid with the insulating regions 17. At each of these layered portions AR1, AR2, and AR3, the covering percentage by the transparent electroconductive film 13 is calculated, and the difference in added values is kept within 30%.

The difference in added values of the covering percentage such as described above is the same even in cases where each of the electrode regions 15x1, 15x2, and so on, and the electrode regions 15y1, 15y2, and so on, have locally different covering percentages by the transparent electroconductive film. For example, this is also the same in cases where the width of the electrode regions 15x1, 15x2, and so on, and the electrode regions 15y1, 15y2, and so on, do not have the same width in the direction perpendicular to the electroconductive direction, and the covering percentage by the transparent electroconductive film 13 has been adjusted so as to be higher at portions where the width is narrow as compared to portions where the width is wide.

Also, while description will be omitted here, the information input device 3 has multiple terminals provided thereto in order to individually apply measurement voltage to each of the electrode regions 15x1, 15x2, and so on, and 15y1, 15y2, and so on, of the transparent electrode devices 1x and 1y.

Further, an optical layer 35 may be provided above the transparent electrode device 1x serving as the information input side of the information input device 3 via an adhesive layer 33 as appropriate. The adhesive layer 33 and optical layer 35 are configured of a transparent material. Alternatively, a ceramic coat layer (over coat) formed of a silicon oxide (SiO$_2$) film may be provided instead of the optical layer 35.

With the information input device 3 such as described above, measurement voltage is alternately applied to the electrode regions 15x1, 15x2, and so on, provided arrayed to the transparent electrode device 1x, and the electrode regions 15y1, 15y2, and so on, provided arrayed to the transparent electrode device 1y. Upon a finger or stylus coming into contact with the face of the substrate 11 in this state, the capacitance existing at the various portions within the information input device 3 changes, and is manifested in change in measurement voltage at the electrode regions 15x1, 15x2, and so on, and 15y1, 15y2, and so on. This change differs depending on the distance from the position where the finger or stylus has come into contact, and is greatest at the position where the finger or stylus has come into contact. Accordingly, the position with an address of electrode region 15xn, 15yn where the change in measurement voltage is the greatest is detected as the position where the finger or stylus has come into contact.

Advantages of Fifth Embodiment

With the information input device 3 according to the fifth embodiment described above, transparent electrode devices 1x and 1y described with the first through fourth embodiment and further the modifications are used. Accordingly, visual recognition of the electrode regions 15x1, 15x2, and so on, and 15y1, 15y2, and so on, can be minimized. Accordingly, in a case where the information input device 3 is disposed on the display face of a display panel, the patterns of the electrode regions 15x1, 15x2, and so on, and 15y1, 15y2, and so on in the information input device 3 can be prevented from affecting display properties of a display panel to which the information input device 3 can be mounted, as described next.

With the fifth embodiment, description has been made regarding the configuration of the information input device 3 using two transparent electrode devices 1x and 1y. However, the information input device according to the present application is not restricted to this configuration, and can be widely applied to information input devices with configurations having transparent electrode devices.

the information input device may be of a configuration having a transparent electrode device in which the electrode regions 15x1, 15x2, and so on, and 15y1, 15y2, and so on, are provided on the same face of a single substrate 11, in a state of being insulated from each other. In this case, one of the electrode regions 15x1, 15x2, and so on, and 15y1, 15y2, and so on, preferably has electrical connection via relay electrodes at intersection portions of the two. As for the configuration of the electrode regions 15x1, 15x2, and so on, and 15y1, 15y2, and so on, using such relay electrodes, the related art disclosed in Japanese Unexamined Patent Application Publication No. 2009-53893, for example, may be employed.

Further, the information input device may be a resistance film touch panel, and the related art disclosed in Japanese Unexamined Patent Application Publication No. 2009-211978, for example, may be employed. Advantages the same as with the information input device 3 according to the fifth embodiment can be obtained with this configuration as well.

10. Sixth Embodiment

Display Device Using Information Input Device

Figure 22:
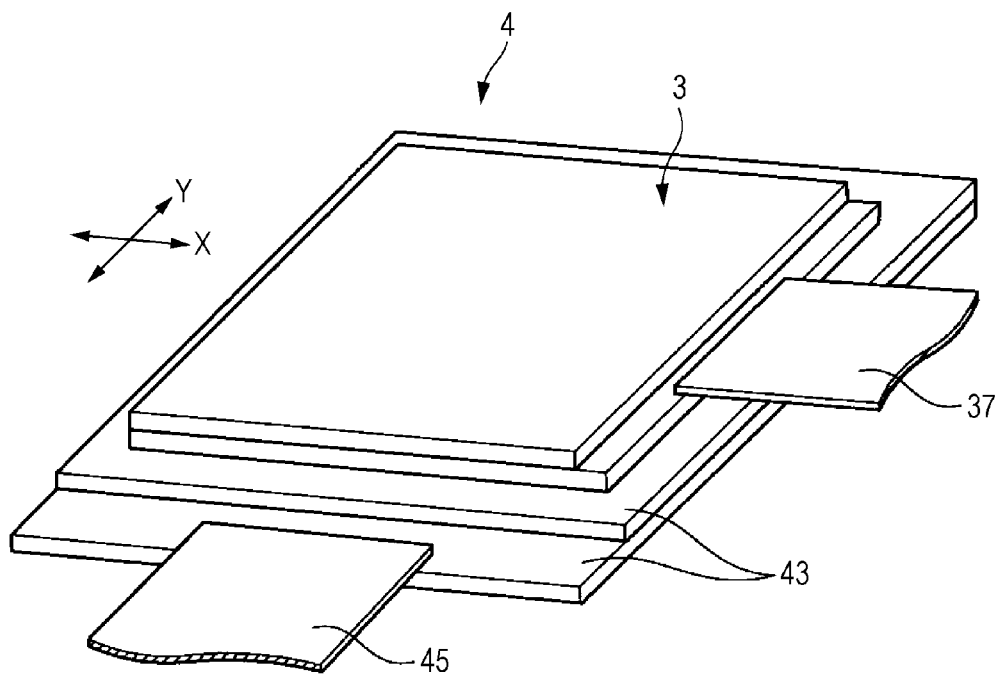
FIG. 22 is a perspective view for describing the configuration of a display device (electronic equipment) having the information input device.

FIG. 22 is a perspective view of a display device having an information input device, as an example of electronic equipment according to the present application. A display device 4 shown in FIG. 22 is configured by disposing the information input device 3 of the configuration described with the fifth embodiment, for example, on the display face of a display panel 43.

Examples of the display panel 43 include various types of flat-screen display devices, such as liquid crystal displays, PDPs (Plasma Display Panels), EL (Electro Luminescence) displays, SED (Surface-conduction Electron-emitter Displays), and so forth, though the display panel 43 is not restricted to these. Further the display panel 43 may be a CRT (Cathode Ray Tube) display or the like.

A flexible printed circuit board 45, for example, is connected to the display panel 43, so that display image signals are input. The information input device 3 is overlaid on the image display face of this display panel 43 so as to cover the display face. A flexible printed circuit board 37 is connected to the information input device 3, from which the above-described measurement voltage is applied to the electrode regions 15x1, 15x2, and so on, and 15y1, 15y2, and so on, of the information input device 3. Accordingly, the user can input contact position information to the information input device 3 by bringing a finger or stylus into contact with a part of the display image displayed on the display panel 43, by way of the information input device 3.

Advantages of Sixth Embodiment

With the display device 4 according to the sixth embodiment described above, the information input device 3 of the configuration described with the fifth embodiment is disposed upon the display face of the display panel 43. Accordingly, display on the display panel 43 is not affected by visual recognition of the electrode regions 15$x$1, 15$x$2, and so on, and 15$y$1, 15$y$2, and so on, making up the information input device 3. Accordingly, high definition display at the display panel 43 can be ensured even though the information input device 3 is provided thereto.

11. Seventh Embodiment

Example of Application to Electronic Equipment

FIGS. 23 through 27 illustrate examples of electronic equipment regarding which the display device having the information input device according to the sixth embodiment described with reference to FIG. 22 has been applied to the display unit. Examples of application of the electronic equipment according to the present application will now be described.

Figure 23:
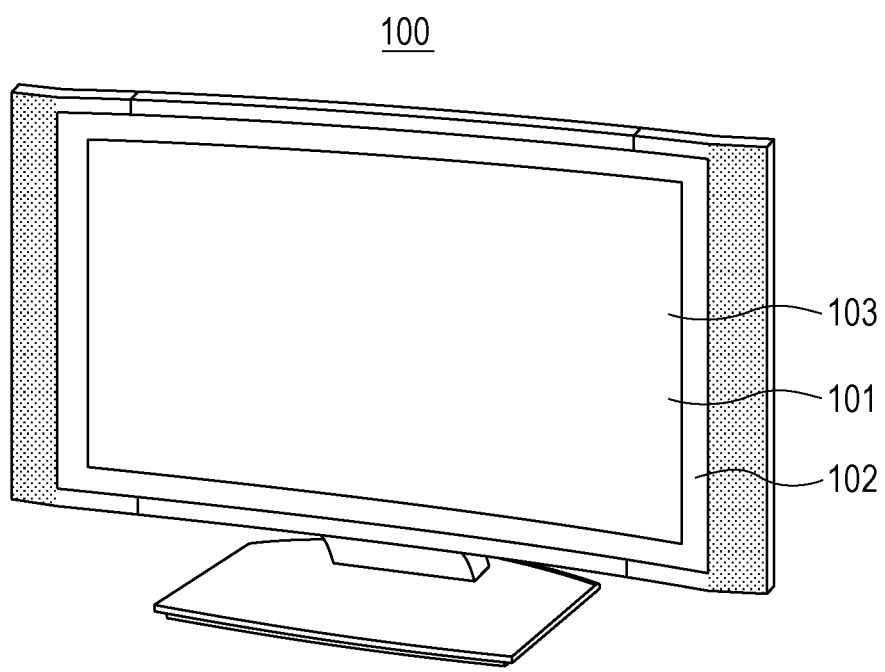
FIG. 23 is a perspective view for describing the configuration of a television (electronic equipment) having a display portion.

FIG. 23 is a perspective view illustrating a television to which the present application has been applied. The television 100 in this application example includes a display unit 101 configured of a front panel 102, filter glass 103, and so forth, and the above-described display device is applied as the display unit 101.

Figure 24A:
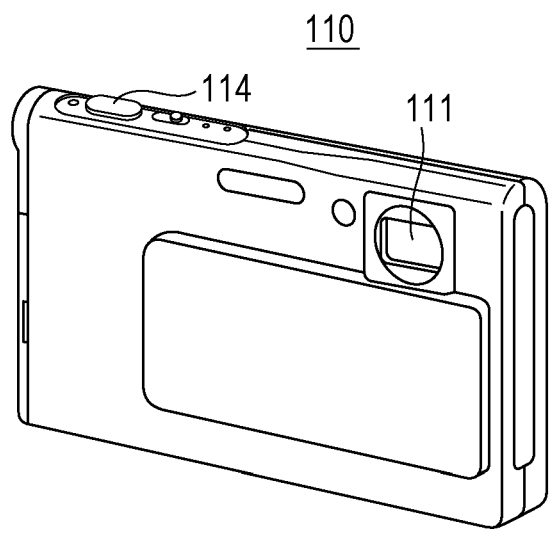
FIGS. 24A and 24B are perspective views for describing the configuration of a digital camera (electronic equipment) having a display portion.
Figure 24B:
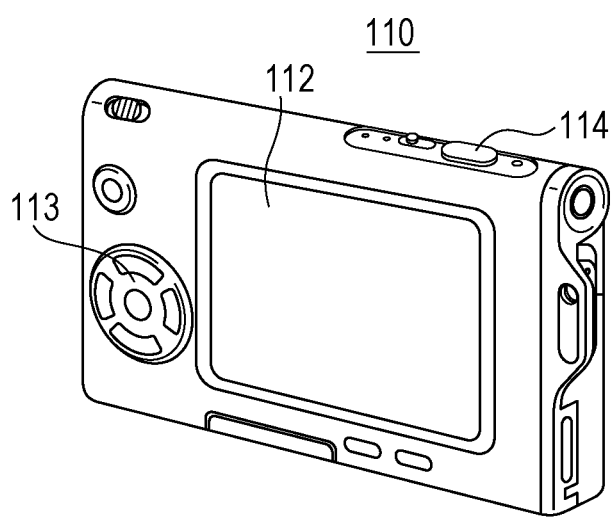

FIGS. 24A and 24B are diagrams illustrating a digital camera to which the present application has been applied, with FIG. 24A being a perspective view from the front and FIG. 24B being a perspective view from the rear. The digital camera 110 in this application example includes a light-emitting unit 111 serving as a flash, a display unit 112, a menu switch 113, a shutter button 114, and so forth, and the above-described display device is applied as the display unit 112.

Figure 25:
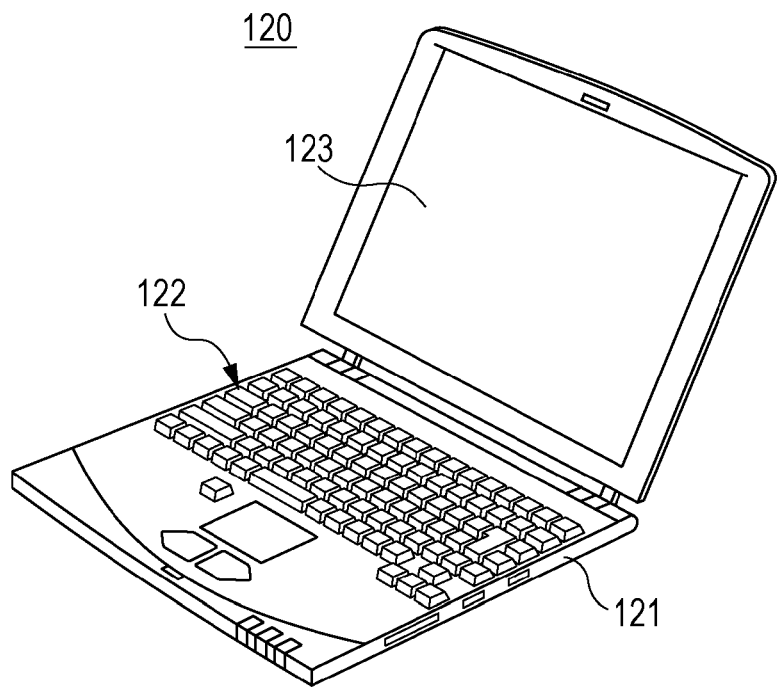
FIG. 25 is a perspective view for describing the configuration of a laptop personal computer (electronic equipment) having a display portion.

FIG. 25 is a perspective view illustrating a laptop personal computer to which the present application has been applied. The laptop personal computer 120 in this application example includes, on a main unit 121, a keyboard 122 operated to input text and so forth, a display unit 123 to display images, and so forth, and the above-described display device is applied as the display unit 123.

Figure 26:
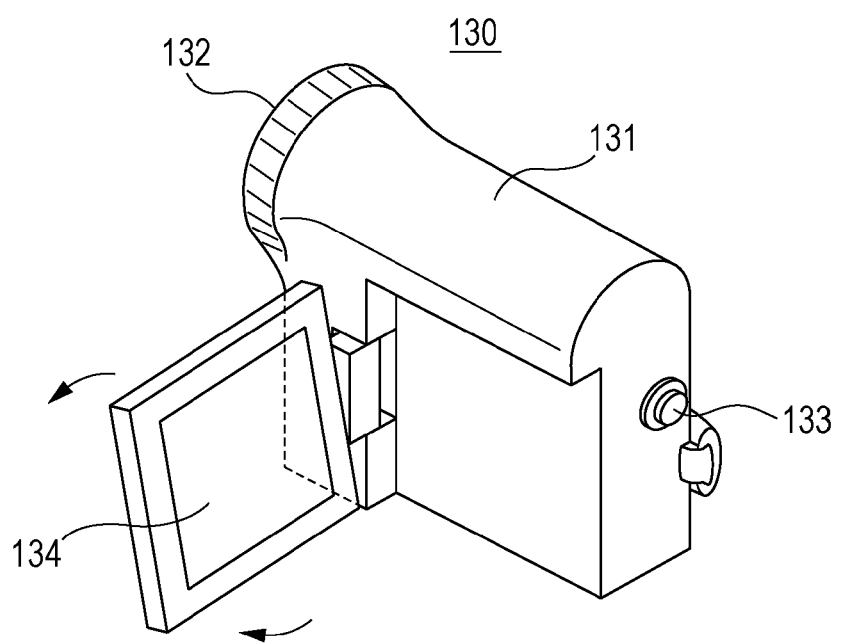
FIG. 26 is a perspective view for describing the configuration of a video camera (electronic equipment) having a display portion.

FIG. 26 is a perspective view illustrating a video camera to which the present application has been applied. The video camera 130 in this application example includes a main unit 131, a subject imaging lens 132 facing forward, an imaging start/stop switch 133, a display unit 134, and so forth, and the above-described display device is applied as the display unit 134.

Figure 27:
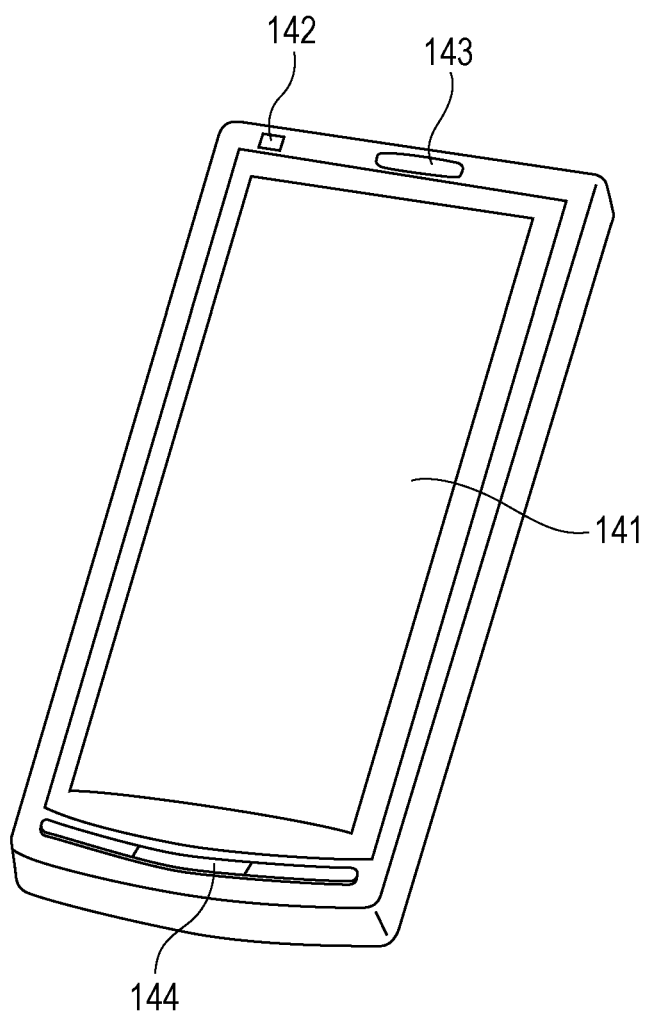
FIG. 27 is a front view for describing the configuration of a portable terminal device (electronic equipment) having a display portion.

FIG. 27 is a perspective view illustrating a portable terminal device to which the present application has been applied. The portable terminal device 140 in this application example includes a display unit 141 provided to the center of the front panel, and on the perimeter thereof a sensor 142, a speaker 143, operating switches 144, and so forth, and the above-described display device is applied as the display unit 141.

Advantages of Seventh Embodiment

The electronic equipment according to the seventh embodiment described above uses the display device described with the sixth embodiment as the display unit thereof, so high definition display can be performed even though an information input device is provided to the entire face of the display panel.

EXAMPLES

As shown in the following first through eighth examples, two transparent electrode devices having electrode regions and insulating regions were fabricated, and a layered body with the two fabricated transparent electrode device layered upon each other was fabricated. The fabricated transparent electrode devices and the layered body thereof were evaluated regarding visual non-recognition, moiré and interference light, and glittering, of the electrode regions. The parameters and evaluation results of the examples are shown in Tables 3 and 4.

Evaluation of visual non-recognition, moiré and interference light, and glittering, of the electrode regions was performed as follows. First, transparent electrode devices or a layered body thereof were applied to a 3.5-inch (diagonal dimensions) liquid crystal display via an adhesive sheet, so that the face on which the transparent electroconductive film was formed faced the screen. Next, an anti-reflection film was applied to the substrate side of the transparent electrode devices or layered body thereof, via an adhesive sheet. Subsequently, the liquid crystal display was made to display black or green, the display screen was visually observed, and evaluation was made regarding of visual non-recognition, moiré and interference light, and glittering. Note that in the following evaluation, "G" stands for "good", "F" stands for "fair", and "P" stands for "poor".

Visual Non-Recognition

G: The external shape of the electrode regions are completely unrecognizable visually, regardless of the viewing angle.

F: The pattern is very difficult to visually recognize, but can be visually recognized depending on the angle.

P: Visually recognizable.

Moiré and Interference Light

G: Neither moiré nor interference light can be sensed regardless of the angle of observation.

F: Neither moiré nor interference light can be sensed when viewed from the front, but some moiré or interference light can be sensed when observed from an angle.

P: Moiré or interference light can be sensed when observed from the front.

Glittering

G: No glittering can be sensed regardless of the angle of observation.

F: No glittering can be sensed when viewed from the front, but some glittering can be sensed when observed from an angle.

P: Glittering can be sensed when observed from the front.

First Through Fourth Examples

Using PET film of a thickness of 125 μm as a substrate, a transparent electroconductive film formed of ITO was formed on this substrate by sputtering, thereby obtaining a transparent electroconductive film. The sheet resistance of this transparent electroconductive film was 150 Ω/sq.

Next, a resist layer was formed on the transparent electroconductive film formed of ITO, and the resist layer was exposed using a chromium photo mask with random patterns formed. For this, circular random patterns were employed as the random patterns for the chromium photo mask.

Also, in each of the examples, the hole patterns and island patterns were random patterns including those with a pattern diameter range of 100 μm or greater, and the covering percentage by the transparent electroconductive film was adjusted by adjusting the pattern diameters and closest distances. Note however, that the electrode region according to the fourth example was not provided with hole patterns, and the transparent electroconductive film was provided as a solid film. The outer shape of the electrode region was a rectangular shape.

Next, the resist layer was developed to form a resist pattern, the ITO layer was subjected to wet etching using the resist pattern as a mask, and the resist layer was removed by ashing processing.

Thus, two transparent electrode devices having electrode regions and insulating regions with hole patterns and island patterns randomly formed, were fabricated with the parameters as shown in the following Table 3. A layered body, in which the two fabricated transparent electrode devices were layered such that the electrode regions intersected, was fabricated. Table 3 also indicates the evaluation results of visual non-recognition, moiré and interference light, and glittering, within the electrode region.

ured that there was no problems with occurrence of moiré and interference light, and glittering, as well.

Fifth Through Eighth Examples

Using PET film of a thickness of 125 μm as a substrate, a transparent electroconductive film formed of a silver nanowire layer was formed on this substrate by coating, thereby obtaining a transparent electroconductive film. The sheet resistance of this transparent electroconductive film was 100 Ω/sq. Thereafter, procedures the same as with the first through fourth examples was performed.

Thus, two transparent electrode devices having electrode regions and insulating regions with hole patterns and island

TABLE 3

Transparent Electroconductive Film: ITO

| | | Region | Pattern Diameter [μm] | Closest Distance [μm] | Covering Percentage Of Transparent Electro-conductive Film [μm] | Covering Percentage Difference [%] | Visual Non-Recognition | Moiré & Interference Light | Glittering |
|---|---|---|---|---|---|---|---|---|---|
| Example 1 | Transparent Electrode Device | Electrode Region | 190-316 | 70 | 49.91 | 0.18 | G | G | G |
| | | Insulating Region | 190-316 | 70 | 50.09 | | | | |
| | Layered Body | | | | | Maximum 0.36 | G | G | G |
| Example 2 | Transparent Electrode Device | Electrode Region | 30-120 | 75 | 79.37 | 13.9 | G | G | G |
| | | Insulating Region | 190-316 | 30 | 65.47 | | | | |
| | Layered Body | | | | | Maximum 27.8 | G | G | G |
| Example 3 | Transparent Electrode Device | Electrode Region | 70-135 | 105 | 80.02 | 29.93 | G | G | G |
| | | Insulating Region | 190-316 | 70 | 50.09 | | | | |
| | Layered Body | | | | | Maximum 59.86 | F | G | G |
| Example 4 | Transparent Electrode Device | Electrode Region | — | — | 100 | 49.91 | F | G | G |
| | | Insulating Region | 190-316 | 70 | 50.09 | | | | |
| | Layered Body | | | | | Maximum 99.82 | P | G | G |

From the evaluation results shown in Table 3, it was confirmed that even if patterns of a pattern diameter of 100 μm or greater, which are readily visually recognized, are included, good visual non-recognition properties can be obtained for both transparent electrode device and layered body by suppressing the covering percentage difference by the transparent electroconductive film to within 30%. It was also configpatterns randomly formed, were fabricated with the parameters as shown in the following Table 4. A layered body, in which the two fabricated transparent electrode devices were layered such that the electrode regions intersected, was fabricated. Table 4 also indicates the evaluation results of visual non-recognition, moiré and interference light, and glittering, within the electrode region.

TABLE 4

Transparent Electroconductive Film: Silver Nanowires

| | | Region | Pattern Diameter [μm] | Closest Distance [μm] | Covering Percentage Of Transparent Electro-conductive Film [μm] | Covering Percentage Difference [%] | Visual Non-Recognition | Moiré & Interference Light | Glittering |
|---|---|---|---|---|---|---|---|---|---|
| Example 5 | Transparent Electrode Device | Electrode Region | 190-316 | 70 | 49.91 | 0.18 | G | G | G |
| | | Insulating Region | 190-316 | 70 | 50.09 | | | | |
| | Layered Body | | | | | Maximum 0.36 | G | G | G |

TABLE 4-continued

Transparent Electroconductive Film: Silver Nanowires

| | Region | | Pattern Diameter [μm] | Closest Distance [μm] | Covering Percentage Of Transparent Electro-conductive Film [μm] | Covering Percentage Difference [%] | Visual Non-Recognition | Moiré & Interference Light | Glittering |
|---|---|---|---|---|---|---|---|---|---|
| Example 6 | Transparent Electrode Device | Electrode Region | 30-120 | 75 | 79.37 | 13.9 | G | G | G |
| | | Insulating Region | 190-316 | 30 | 65.47 | | | | |
| | Layered Body | | | | | Maximum 27.8 | G | G | G |
| Example 7 | Transparent Electrode Device | Electrode Region | 70-135 | 105 | 80.02 | 29.93 | G | G | G |
| | | Insulating Region | 190-316 | 70 | 50.09 | | | | |
| | Layered Body | | | | | Maximum 59.86 | F | G | G |
| Example 8 | Transparent Electrode Device | Electrode Region | — | — | 100 | 49.91 | F | G | G |
| | | Insulating Region | 190-316 | 70 | 50.09 | | | | |
| | Layered Body | | | | | Maximum 99.82 | P | G | G |

From the evaluation results shown in Table 4, it was confirmed that effects the same as with the first through fourth examples were obtained in the case of using a silver nanowire layer as the transparent electroconductive film. That is to say, it was confirmed that even if patterns of a pattern diameter of 100 μm or greater, which are readily visually recognized, are included, good visual non-recognition properties can be obtained for both transparent electrode device and layered body by suppressing the covering percentage difference by the transparent electroconductive film to within 30%. It was also configured that there was no problems with occurrence of moiré and interference light, and glittering, as well.

Further, with the fifth through seventh examples, providing hole patterns in the electrode regions allows the covering percentage by the transparent electroconductive film made up of the silver nanowire layer to be suppressed. Accordingly, the reflected luminosity of diffuse reflection of external light at the surface of the silver nanowire layer was reduced. Also, comparing the fifth through seventh examples with the eighth example where the electrode region was formed as a solid film, in a configuration where the transparent electrode device was disposed upon a display face of a display panel, the configurations using the transparent electrode devices according to the fifth through seventh examples having the hole patterns in the electrode regions were found to exhibit a more solid black display. Accordingly, effects of improved display properties were also observed in the display devices having the touch panel using the transparent electrode devices provided thereupon.

As further examples, the silver nanowire layer (transparent electroconductive film) having the random pattern, obtained with the fifth through eighth embodiments, was dipped in a solution in which was dissolved a colored compound, such that the colored compound was adsorbed to the surface of the silver nanowire layer. Due to this processing, the reflected luminosity at both the electrode region formed of silver nanowire layer (transparent electroconductive film) and the insulating region, according to the fifth through eighth embodiments, was found to be reduced. Accordingly, it was confirmed that display properties at a display panel can be maintained even with a touch panel provided on the display screen, by using a transparent electrode device with a transparent electroconductive film in which a metal nanowire layer has colored compound adsorbed at the surface thereof, and random patterns formed therein, as the touch panel.

Note that the present application may also assume the following configurations.

(1) A transparent electrode device includes:
a substrate;
an electrode region formed on the substrate using a transparent electroconductive film; and
an insulating region disposed on the substrate and adjacent to the electrode region, in which a plurality of random island patterns including patterns having a width of 100 μm or greater, formed using the transparent electroconductive film, are disposed mutually distanced from one another.

(2) The transparent electrode device according to (1), wherein a width of the plurality of island patterns is smaller than a smallest region width of the insulating region.

(3) The transparent electrode device according to (1) or (2), wherein the electrode region has plurality of hole patterns provided in the transparent electroconductive film, the hole patterns being distanced from one another.

(4) The transparent electrode device according to (3), wherein the hole pattern of the electrode region and the island pattern of the insulating region are different random patterns.

(5) The transparent electrode device according to (3) or (4), wherein the hole pattern of the electrode region and the island pattern of the insulating region are based on random patterns separately generated with different conditions.

(6) The transparent electrode device according to (3) or (4), wherein the hole pattern of the electrode region and the island pattern of the insulating region are patterns where random patterns are generated at the same time and separately reduced.

(7) The transparent electrode device according to any one of (1) through (6), wherein groove patterns dividing the transparent electroconductive film extend in random directions in the insulating region, with the island patterns being provided between the groove patterns.

(8) The transparent electrode device according to (3), wherein a plurality of band patterns formed of the transparent electroconductive film are provided in the electrode region extending in random directions, with the hole patterns being provided between the band patterns.

(9) The transparent electrode device according to any one of (1) through (8), wherein the substrate is formed of a transparent material.

(10) An information input device including:
a substrate;
an electrode region formed on the substrate using a transparent electroconductive film; and
an insulating region disposed on the substrate and adjacent to the electrode region, in which a plurality of random island patterns including patterns having a width of 100 μm or greater, formed using the transparent electroconductive film, are disposed mutually distanced from one another.

(11) The information input device according to (10), wherein the substrate is configured of a transparent material;
and wherein the electrode region and the insulating region are provided on both face sides of the substrate;
and wherein the electrode regions provided on both face sides of the substrate are disposed so as to intersect one another across the substrate.

(12) The information input device according to (11), wherein an inter-region difference of a value obtained by taking a covering percentage of the transparent electroconductive film as to the substrate, and adding both faces worth of the substrate of this value, is 30% or smaller.

(13) Electronic equipment including:
a display panel;
an electrode region formed on a display side of the display panel using a transparent electroconductive film; and
an insulating region disposed on the display side of the display panel and adjacent to the electrode region, in which a plurality of random island patterns including patterns having a width of 100 μm or greater, formed using the transparent electroconductive film, are disposed mutually distanced from one another.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A transparent electrode device comprising:
a substrate;
an electrode region formed on said substrate using a transparent electroconductive film; and
an insulating region disposed on said substrate and adjacent to said electrode region, in which a plurality of random island patterns including patterns having a width of 100 μm or greater, formed using the transparent electroconductive film, are disposed mutually distanced from one another.

2. The transparent electrode device according to claim 1, wherein a width of said plurality of island patterns is smaller than a smallest region width of said insulating region.

3. The transparent electrode device according to claim 1, wherein said electrode region has plurality of hole patterns provided in said transparent electroconductive film, said hole patterns being distanced from one another.

4. The transparent electrode device according to claim 3, wherein the hole pattern of said electrode region and the island pattern of said insulating region are different random patterns.

5. The transparent electrode device according to claim 4, wherein the hole pattern of said electrode region and the island pattern of said insulating region are based on random patterns separately generated with different conditions.

6. The transparent electrode device according to claim 4, wherein the hole pattern of said electrode region and the island pattern of said insulating region are patterns where random patterns are generated at the same time and separately reduced.

7. The transparent electrode device according to claim 1, wherein groove patterns dividing said transparent electroconductive film extend in random directions in said insulating region, with said island patterns being provided between said groove patterns.

8. The transparent electrode device according to claim 3, wherein a plurality of band patterns formed of said transparent electroconductive film are provided in said electrode region extending in random directions, with said hole patterns being provided between said band patterns.

9. The transparent electrode device according to claim 1, wherein said substrate is formed of a transparent material.

10. An information input device comprising:
a substrate;
an electrode region formed on said substrate using a transparent electroconductive film; and
an insulating region disposed on said substrate and adjacent to said electrode region, in which a plurality of random island patterns including patterns having a width of 100 μm or greater, formed using the transparent electroconductive film, are disposed mutually distanced from one another.

11. The information input device according to claim 10, wherein said substrate is configured of a transparent material;
and wherein said electrode region and said insulating region are provided on both face sides of said substrate;
and wherein said electrode regions provided on both face sides of said substrate are disposed so as to intersect one another across said substrate.

12. The information input device according to claim 11, wherein an inter-region difference of a value obtained by taking a covering percentage of said transparent electroconductive film as to said substrate, and adding both faces worth of said substrate of this value, is 30% or smaller.

13. Electronic equipment comprising:
a display panel;
an electrode region formed on a display side of said display panel using a transparent electroconductive film; and
an insulating region disposed on the display side of said display panel and adjacent to said electrode region, in which a plurality of random island patterns including patterns having a width of 100 μm or greater, formed using the transparent electroconductive film, are disposed mutually distanced from one another.

* * * * *